United States Patent
Zhang et al.

(10) Patent No.: US 10,545,167 B2
(45) Date of Patent: Jan. 28, 2020

(54) MULTIPLE-AXIS RESONANT ACCELEROMETERS

(71) Applicant: Analog Devices, Inc., Norwood, MA (US)

(72) Inventors: Xin Zhang, Acton, MA (US); Michael W. Judy, Ipswich, MA (US); Mehrnaz Motiee, Cambridge, MA (US)

(73) Assignee: Analog Devices, Inc., Norwood, MA (US)

( * ) Notice: Subject to any disclaimer, the term of this patent is extended or adjusted under 35 U.S.C. 154(b) by 364 days.

(21) Appl. No.: 14/887,973

(22) Filed: Oct. 20, 2015

(65) Prior Publication Data

US 2017/0108529 A1     Apr. 20, 2017

(51) Int. Cl.
*G01P 15/097*     (2006.01)
*G01P 15/18*     (2013.01)

(52) U.S. Cl.
CPC ............ *G01P 15/097* (2013.01); *G01P 15/18* (2013.01)

(58) Field of Classification Search
CPC .............................. G01P 15/097; G01P 15/18
See application file for complete search history.

(56) References Cited

U.S. PATENT DOCUMENTS

| | | | |
|---|---|---|---|
| 4,805,456 A | 2/1989 | Howe et al. | |
| 6,089,088 A | 7/2000 | Charvet | 73/504.12 |
| 6,257,059 B1 | 7/2001 | Weinberg et al. | 73/504.16 |
| 8,671,756 B2 | 3/2014 | Comi et al. | 73/514.29 |
| 9,010,184 B2 | 4/2015 | Zou et al. | G01P 15/25 |
| 2005/0024527 A1 | 2/2005 | Chiou | 348/373 |
| 2009/0272189 A1* | 11/2009 | Acar | G01C 19/574 73/504.16 |
| 2011/0056293 A1* | 3/2011 | Mori | G01C 19/5776 73/504.12 |
| 2011/0154898 A1* | 6/2011 | Cazzaniga | G01C 19/5747 73/504.12 |

(Continued)

OTHER PUBLICATIONS

Hansen et al., "A New Single Mass Triaxial Accelerometer for Modal Analysis," IMAC-XXI: Conference & Exposition on Structural Dynamics, 8 pages, 2003.

(Continued)

*Primary Examiner* — Justin Seo
*Assistant Examiner* — John M Royston
(74) *Attorney, Agent, or Firm* — Wolf, Greenfield & Sacks, P.C.

(57) ABSTRACT

Multiple-axis resonant accelerometers are based on detection of resonance frequency changes of one or more electrostatically-driven resonator masses due to electrostatic gap changes under acceleration. Specifically, one or more resonator masses are configured to resonate simultaneously in different directions associated with different axes of sensitivity (e.g., X, Y, and/or Z axes). The motion of each resonator mass is monitored through one or more electrostatically-coupled sense electrodes. An acceleration along a particular axis of sensitivity causes a small change in the electrostatic gap(s) between the corresponding resonator mass(es) and the sense electrode(s) associated with that axis of sensitivity, and this electrostatic gap change manifests as a small change in the resonance frequency of the resonator from which an accelerometer output signal can be produced.

20 Claims, 11 Drawing Sheets

(56) References Cited

U.S. PATENT DOCUMENTS

| | | | | |
|---|---|---|---|---|
| 2013/0031977 | A1* | 2/2013 | Kempe | G01C 19/5747 |
| | | | | 73/504.04 |
| 2013/0204571 | A1* | 8/2013 | Savchenko | G01P 15/097 |
| | | | | 702/141 |
| 2013/0214367 | A1* | 8/2013 | van der Heide | H01L 29/84 |
| | | | | 257/415 |
| 2013/0283911 | A1 | 10/2013 | Ayazi et al. | 73/504.12 |
| 2014/0260615 | A1* | 9/2014 | Simon | G01P 15/097 |
| | | | | 73/514.29 |
| 2015/0226762 | A1* | 8/2015 | Seshia | G01P 1/006 |
| | | | | 73/495 |
| 2017/0108336 | A1* | 4/2017 | Boysel | G01P 15/0802 |
| 2018/0209791 | A1* | 7/2018 | Chang | G01P 15/097 |

OTHER PUBLICATIONS

Liu et al., "A New Design for Triaxial Piezoelectric Accelerometer," IMAC-XX: Conference & Exposition on Structural Dynamics, 6 pages, 2002.

Tabata et al., "Two-axis detection resonant accelerometer based on rigidity change," Sensors and Actuators, vol. 75, issue 1, pp. 53-59, May 1999.

Yang et al., "A new silicon triaxial resonant micro-accelerometer," Proceedings of the 2014 International Conference on Information Science, Electronics and Electrical Engineering (ISEEE), Sapporo, Japan, vol. 2, pp. 1283-1286, Apr. 26-28, 2014.

Yang et al., "A New Z-axis Resonant Micro-Accelerometer Based on Electrostatic Stiffness," Sensors, vol. 15, No. 1, pp. 687-702, Jan. 2015.

International Searching Authority, International Search Report—International Application No. PCT/US2016/057017, dated Jan. 31, 2017, together with the Written Opinion of the International Searching Authority, 10 pages.

International Preliminary Report on Patentability dated May 3, 2018 in connection with International Application No. PCT/US2016/057017.

* cited by examiner

MULTIPLE-AXIS RESONANT ACCELEROMETERS

FIELD OF THE INVENTION

The present invention relates generally to resonant accelerometers, and, more particularly, to multiple-axis resonant accelerometers based on detection of resonance frequency changes of one or more electrostatically-driven resonator masses due to electrostatic gap changes under acceleration.

BACKGROUND OF THE INVENTION

An accelerometer is a type of transducer that converts acceleration forces into electronic signals. Accelerometers are used in a wide variety of devices and for a wide variety of applications. For example, accelerometers are often included various automobile systems, such as for air-bag deployment and roll-over detection. Accelerometers are often also included in many computer devices, such as for motion-based sensing (e.g., drop detection) and control (e.g., motion-based control for gaming).

Generally speaking, a MEMS (Micro Electro Mechanical System) accelerometer typically includes, among other things, a proof mass and one or more sensors for sensing movement or changes in position of the proof mass induced by external accelerations. Accelerometers can be configured to sense one, two, or three axes of acceleration. Typically, the proof mass is configured in a predetermined device plane, and the axes of sensitivity are generally referred to with respect to this device plane. For example, accelerations sensed along an axis parallel to the device plane are typically referred to as X or Y axis accelerations, while accelerations sensed along an axis perpendicular to the device plane are typically referred to as Z axis accelerations. A single-axis accelerometer might be configured to detect just X or Y axis accelerations or just Z axis accelerations. A two-axis accelerometer might be configured to detect X and Y axis accelerations or might be configured to detect X and Z axis accelerations. A three-axis accelerometer might be configured to detect X, Y, and Z axis accelerations.

SUMMARY OF EXEMPLARY EMBODIMENTS

In certain embodiments there is provided a multiple-axis resonant accelerometer comprising a resonator comprising at least one resonator mass arranged in a device plane; a set of x-axis drive electrodes configured for driving x-axis motions of the at least one resonator mass in the device plane; a set of y-axis drive electrodes configured for driving y-axis motions of the at least one resonator mass in the device plane; a set of x-axis sense electrodes configured for sensing changes in x-axis resonance frequency of the at least one resonator mass based on electrostatic spring tuning in the presence of an x-axis acceleration; and a set of y-axis sense electrodes configured for sensing changes in y-axis resonance frequency of the at least one resonator mass based on electrostatic spring tuning in the presence of a y-axis acceleration.

In certain other embodiments there is provided a method of operating a multiple-axis resonant accelerometer having a resonator comprising at least one resonator mass arranged in a device plane. The method involves driving the at least one resonator mass to resonate with both x-axis motions and y-axis motions in the device plane; sensing changes in x-axis resonance frequency of the at least one resonator mass based on electrostatic spring tuning in the presence of an x-axis acceleration; and sensing changes in y-axis resonance frequency of the at least one resonator mass based on electrostatic spring tuning in the presence of a y-axis acceleration.

In certain other embodiments there is provided a multiple-axis resonant accelerometer comprising a resonator comprising at least one resonator mass arranged in a device plane; means for driving at least one resonator mass to resonate with both x-axis motions and y-axis motions in the device plane; means for sensing changes in x-axis resonance frequency of the at least one resonator mass based on electrostatic spring tuning in the presence of an x-axis acceleration; and means for sensing changes in y-axis resonance frequency of the at least one resonator mass based on electrostatic spring tuning in the presence of a y-axis acceleration.

In various alternative embodiments, the at least one resonator mass may include a plurality of resonator masses coupled to operate as a single resonating body, and each set of sense electrodes may be configured for single-ended sensing of resonance frequency changes. Alternatively, the at least one resonator mass may include a plurality of resonator masses, each set of drive electrodes may be configured for driving a first subset of the resonator masses in anti-phase with a second subset of the resonator masses, and each set of sense electrodes may be configured for differential sensing of resonance frequency changes. The x-axis motions and the y-axis motions may be driven at the same resonance frequency or may be driven at different resonance frequencies. The changes in resonance frequency for a given axis may be based on differences in voltages between the drive electrodes associated with the given axis and the sense electrodes associated with the given axis.

Various alternative embodiments may additionally include Z-axis sensing such that the resonator further comprises at least one z-axis sensor element configured to resonate with z-axis motions normal to the device plane, wherein each z-axis sensor element is part of a distinct resonator mass. Z-axis motions of the at least one z-axis sensor are driven, e.g., via a set of z-axis drive electrodes. Changes in z-axis resonance frequency of the at least one z-axis sensor element are sensed based on electrostatic spring tuning in the presence of a z-axis acceleration, e.g., via a set of z-axis sense electrodes configured. Each z-axis sensor element may include a teeter-totter sensor element.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
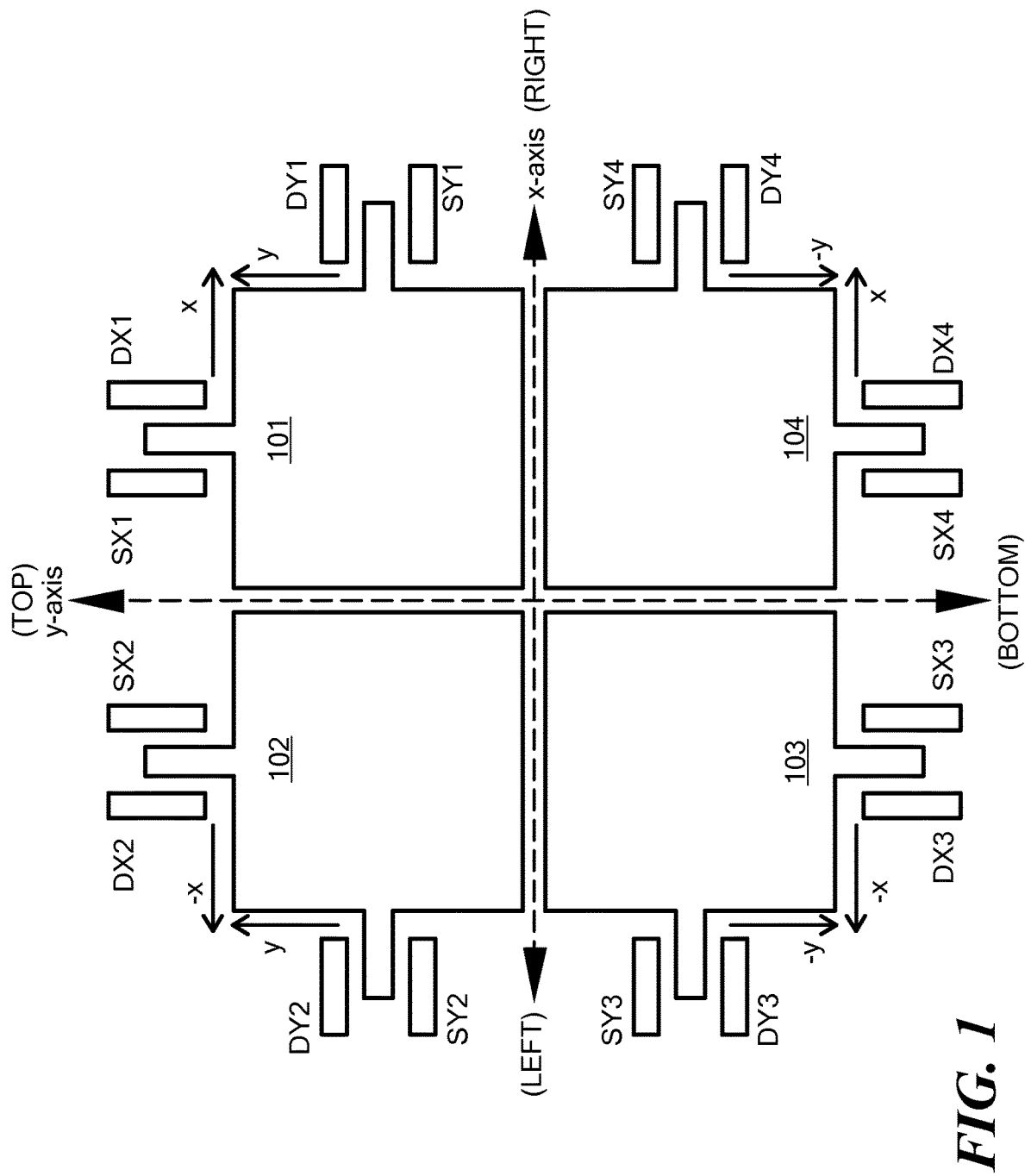
FIG. 1 is a schematic top view diagram of device layer structures for an X-Y axis resonant accelerometer using differential X/Y axis sensing with weak or no coupling of the resonator masses, in accordance with one exemplary embodiment of the present invention.

Multiple-axis resonant accelerometers (RXL) are based on detection of resonance frequency changes of one or more electrostatically-driven resonator masses due to electrostatic gap changes under acceleration. Specifically, one or more resonator masses are configured to resonate simultaneously in different directions associated with one or more axes of sensitivity (e.g., X, Y, and/or Z axes). The motion of each resonator mass is monitored through one or more electrostatically-coupled sense electrodes. An acceleration along a particular axis of sensitivity causes displacement of the resonator mass(es) in the opposite direction, which effectively changes the electrostatic gaps between the mass(es) and the corresponding drive/sense electrodes associated with that particular axis of sensitivity, which in turn effectively changes the electrostatic spring stiffness of the resonator mass(es), which in turn effectively changes the resonance frequencies of the resonator mass(es). Such changes in resonance frequencies (sometimes referred to herein as "frequency pulling" or "electrostatic spring tuning") can be sensed, and an output signal can be generated based on the amount of change in resonance frequencies. The resonance frequencies may be substantially different for each axis of sensitivity (e.g., to help with mitigation of mode injection and locking issues) although common resonance frequencies may be used.

For purposes of the following description and the accompanying claims, a "set" includes one or more members, the "mode" of a resonating body is the shape of motion of the body at resonance, the term "anti-phase" with respect to the resonant modes (i.e., displacement) of two resonating bodies means that the resonating bodies resonate with the same mode shape but 180 degrees out-of-phase, the term "in-plane" with respect to a resonant mode means resonance predominately in the plane of the resonator structure(s), the term "out-of-plane" with respect to a resonant mode means resonance predominately normal to the plane of the resonator structure(s), and an "electrode" is a structure through which an electrical or electromechanical effect is applied and/or sensed. In exemplary embodiments, various electrodes are used for driving resonators into their targeted mode shape at the designed frequency and/or sensing electrical or electromechanical effects through capacitive coupling (e.g., between a resonator mass and one or more adjacent structures), although it should be noted that other types of electrodes and couplings may be used (e.g., piezoelectric). Thus, in exemplary embodiments, electrodes may include a resonator mass and one or more structures for driving and/or sensing movement of the resonator mass.

Various exemplary embodiments are described below with reference to X-Y axis resonant accelerometers having four masses, although the present invention is not limited so such configurations. Two different exemplary operating modes are described. The first exemplary operating mode uses differential X/Y axis sensing with weak or no coupling of the resonator masses. The second exemplary operating mode uses single-ended X/Y axis sensing with strong coupling of the resonator masses.

Differential X/Y Axis Sensing with Weak or No Coupling

FIG. 1 is a schematic top view diagram of device layer structures for an X-Y axis resonant accelerometer using differential X/Y axis sensing with weak or no coupling of the resonator masses, in accordance with one exemplary embodiment of the present invention. In this exemplary embodiment, four resonator masses 101, 102, 103, 104 are supported above an underlying substrate (not represented for convenience) and are driven to resonate simultaneously in the x-axis and the y-axis directions parallel to the underlying substrate by a set of in-plane drive electrodes (drive electrodes DX1, DX2, DX3, DX4 for driving x-axis motions, drive electrodes DY1, DY2, DY3, DY4 for driving y-axis motions) that are fixedly supported directly or indirectly by the underlying substrate. In-plane motions of the resonator masses parallel to the underlying substrate are sensed by a set of in-plane sense electrodes (sense electrodes SX1, SX2, SX3, SX4 for sensing x-axis motions, sense electrodes SY1, SY2, SY3, SY4 for sensing y-axis motions) that are fixedly supported directly or indirectly by the underlying substrate. The x-axis and y-axis are depicted in FIG. 1 for reference purposes and are not part of the resonant accelerometer.

In this exemplary embodiment, each electrode is represented as a single elongated finger structure that is electrostatically coupled (i.e., via a small gap) to a finger structure that extends from the corresponding resonator mass, although it should be noted that other electrode arrangements may be used in various alternative embodiments. For example, in certain alternative embodiments, each electrode may include a plurality of elongated finger structures interdigitated with one or more finger structures extending from the corresponding resonator mass.

In this exemplary operating mode, the resonator masses have weak or no mechanical coupling. Opposing pairs of resonator masses are driven to resonate in anti-phase with one another, and differential sensing is used to produce an accelerometer output for each axis of sensitivity based on resonance frequency changes caused by the frequency pulling effect in the presence of an external acceleration, where one pair of resonator masses undergoes an increase in resonance frequency while the opposing pair of resonator masses undergoes a decrease in resonance frequency in the presence of such external acceleration. The change in resonance frequencies, and hence the magnitude of the external acceleration, can be determined by the difference in resonance frequencies between the two pairs of resonator masses. Generally speaking, such differential sensing increases sensitivity and cancels out common mode errors such as frequency drift due to temperature, moisture, mechanical stress and drive; sense circuitry stability errors.

For the x-axis motions in one exemplary embodiment, resonator masses 101 and 104 are alternately driven by drive electrodes DX1 and DX4 to move back-and-forth in-phase with one another, while resonator masses 102 and 103 are alternately driven by drive electrodes DX2 and DX3 to move back-and-forth in-phase with one another but in anti-phase with resonator masses 101 and 104. Thus, for these x-axis motions, resonator masses 101 and 104 can be viewed as a single body, and resonator masses 102 and 103 can be viewed as a single body. In this example, the movements of resonator masses 101/104 and resonator masses 102/103 can be accomplished by driving drive electrodes DX1, DX2, DX3, and DX4 in-phase with one another, i.e., with the same drive signal applied to all of these drive electrodes. During one phase of x-axis motion, resonator masses 101 and 104 move toward the right (i.e., in the "x" direction) while resonator masses 102 and 103 move toward the left (i.e., in the "−x" direction), and during the anti-phase of x-axis motion, resonator masses 101 and 104 move toward the left (i.e., in the "−x" direction) while resonator masses 102 and 103 move toward the right (i.e., in the "x" direction).

For the y-axis motions in one exemplary embodiment, resonator masses 101 and 102 are alternately driven by drive electrodes DY1 and DY2 to move back-and-forth in-phase with one another, while resonator masses 103 and 104 are alternately driven by drive electrodes DY3 and DY4 to move back-and-forth in-phase with one another but in anti-phase with resonator masses 101 and 102. Thus, for these y-axis motions, resonator masses 101 and 102 can be viewed as a single body, and resonator masses 103 and 104 can be viewed as a single body. In this example, the movements of resonator masses 101/102 and resonator masses 103/104 can be accomplished by driving drive electrodes DY1, DY2, DY3, and DY4 in-phase with one another, i.e., with the same drive signal applied to all of these drive electrodes. During one phase of y-axis motion, resonator masses 101 and 102 move toward the top (i.e., in the "y" direction) while resonator masses 103 and 104 move toward the bottom (i.e., in the "−y" direction), and during the anti-phase of y-axis motion, resonator masses 101 and 102 move toward the bottom (i.e., in the "−y" direction) while resonator masses 103 and 104 move toward the top (i.e., in the "y" direction).

As mentioned above, the resonator masses may be configured to resonate such that the x-axis resonance frequency and the y-axis resonance frequency are substantially different, e.g., to help with mitigation of mode injection and locking issues. Because the forces on each resonator mass would then include unequal x-axis and y-axis components (e.g., due to different drive frequencies for the two axes), the driven motion of the resonator masses generally would be non-linear and therefore each resonator mass generally would undergo a slight amount of rotation as it resonates back and forth.

An acceleration in a particular direction acts on all four resonator masses and effectively changes the electrostatic gaps between the four masses and the drive/sense electrodes associated with that particular axis of sensitivity, which in turn effectively changes the electrostatic spring stiffness of the resonator mass, which in turn effectively changes the resonance frequencies of the resonator masses. Specifically, the resonance frequency of one pair of resonator masses will increase while the resonance frequencies of the opposing pair of masses will decrease. For convenience, each pair of resonator masses may be referred to herein as a "resonator" such that the accelerometer can be considered as having two resonators for each axis of sensitivity (i.e., for the X-axis, resonator masses 101 and 104 constitute one resonator while resonator masses 102 and 103 constitute the other resonator; for the Y-axis, resonator masses 101 and 102 constitute one resonator while resonator masses 103 and 104 constitute the other resonator).

The resonance frequency of a resonator can be characterized by the equation below and is affected by both mechanical spring constant $K_{mechanical}$ and electrostatic spring constant $K_{electrostatic}$:

$$F_{resonator} = \frac{1}{2\pi} \cdot \sqrt{\frac{K_{mechanical} - K_{sisctrostatic}}{mass}} \qquad (1)$$

The resonance frequency of each resonator can be sensed, and an output signal can be generated based on the difference in resonance frequencies. Generally speaking, the relation between input acceleration and the change in resonance frequencies is expressed in Hz/G (e.g., a particular accelerometer might be designed to operate with a scale factor of, say, 50 Hz/G or 100 Hz/G). Thus, the input acceleration (in terms of G force) can be determined by the change in resonance frequencies (in Hz) based on the scale factor. Different axes of sensitivity may have the same scale factor or may have different scale factors.

In order to operate the resonant accelerometer in this exemplary embodiment, the resonator masses, the drive electrodes, and the sense electrodes must be placed at different electrical potentials. For example, the resonator masses may be placed at a fixed potential (referred to herein as VDC_body) which may be a non-zero voltage or ground. The drive electrodes associated with a particular axis of sensitivity may be biased with a DC bias voltage (referred to herein as VDC_driveX for the x-axis and VDC_driveY for the y-axis) plus a small AC voltage (referred to as VAC_driveX for the x-axis and VAC_driveY for the y-axis), i.e., the drive electrodes DX1, DX2, DX3 and DX4 are biased with VDC_driveX+VAC_driveX to excite the x-axis movements of the resonator masses 101-104 and the drive electrodes DY1, DY2, DY3 and DY4 are biased with VDC_driveY+VAC_driveY to excite the y-axis movements of the resonator masses 101-104. The sense electrodes associated with a particular axis of sensitivity may be biased with a different DC bias voltage (referred to herein as VDC_senseX for the x-axis and VDC_senseY for the y-axis) plus a small AC voltage (referred to as VAC_senseX for the x-axis and VAC_senseY for the y-axis) corresponding to the axis of sensitivity, i.e., sense electrodes SX1, SX2, SX3 and SX4 are biased with VDC_senseX+VAC_senseX and the sense electrodes SY1, SY2, SY3 and SY4 are biased with VDC_senseY+VAC_senseY. Importantly, VDC_driveX and VDC_senseX are unequal from one another and also from VDC_body, and VDC_driveY and VDC_senseY are unequal from one another and also from VDC_body. In various alternative embodiments, VDC_driveX may be equal or unequal to VDC_driveY, VDC_senseX may be equal or unequal to VDC_senseY, and VAC_driveX may be equal or unequal to VAC_driveY. In this exemplary embodiment, VAC_driveX and VAC_senseX are 180 degrees out of phase with one another, and VAC driveY and VAC_senseY are 180 degrees out of phase with one another. For the sake of simplicity, VAC_driveX and VAC_senseX may have the same amplitude as one another and VAC_driveY and VAC_senseY may have the same amplitude as one another, although the amplitudes can be different in alternative embodiments.

X-axis motions of the resonator masses 101-104 are sensed through varying capacitance between each resonator mass 101-104 and its corresponding sense electrode SX1-SX4. The varying capacitance induces a correspondingly varying current on the sense electrode. The sensed currents can be used both as feedback signals (e.g., via phased-lock loop) for driving the X-axis motions of the resonator masses and to sense the resonance frequencies of the resonator masses. Since drive electrodes DX1, DX2, DX3 and DX4 are all driven in-phase in this exemplary embodiment, the electrostatic forces will resonate proof masses 101 and 104 in-phase in the X direction, but will resonate proof masses 102 and 103 out-of-phase (180 phase shift) from proof masses 101 and 104 in the X direction.

Similarly, Y-axis motions of the resonator masses 101-104 are sensed through varying capacitance between each resonator mass 101-104 and its corresponding sense electrode SY1-SY4. The varying capacitance induces a correspondingly varying current on the sense electrode. The sensed currents can be used both as feedback signals (e.g., via phased-lock loop) for driving the Y-axis motions of the resonator masses and to sense the resonance frequencies of the resonator masses. Since drive electrodes DY1, DY2, DY3 and DY4 are all driven in-phase in this exemplary embodiment, the electrostatic forces will resonate proof masses 101 and 102 in-phase in the Y direction, but will resonate proof masses 103 and 104 out-of-phase (180 phase shift) from proof masses 101 and 102 in the Y direction.

Under an external acceleration with respect to a given axis of sensitivity, all four resonator masses will move in the opposite direction with respect to that axis of sensitivity. Due to a frequency pulling effect, one pair of resonator masses will undergo an increase in resonance frequency while the opposing pair of resonator masses will undergo a decrease in resonance frequency with regard to that axis of sensitivity. The resonance frequency of each pair of resonator masses can be sensed via the corresponding sense electrodes, and an output signal can be produced based on the difference in resonance frequencies between the two pairs of resonator masses.

Thus, for example, under an external X-axis acceleration in the −X direction, all four proof masses will move in the +X direction statically while still being driven into resonance. The gap between proof mass 101 and drive electrode DX1 and the gap between proof mass 104 and drive electrode DX4 will become smaller. Due to of proof mass 101 and 104 being proportional to 1/gap^3, the $K_{electrostatic}$ will increase when the gaps become smaller. According to Equation (1), the resonant $K_{frequency}$ of proof masses 101 and 104 will both decrease. This resonant frequency change is sensed via sense electrodes SX1 and SX4 respectively. Under the same condition, the gap between proof mass 102 and drive electrode DX2 and the gap between proof mass 103 and drive electrode DX3 will become larger. Due to $K_{electrostatic}$ of proof mass 102 and 103 being proportional to 1/gap^3, the $K_{electrostatic}$ will decrease when the gaps become larger. According to Equation (1), the resonant frequency Fx of proof masses 102 and 103 will both increase. This resonant frequency change is sensed by SX2 and SX3 respectively.

The inverse occurs under an external X-axis acceleration in the +X direction, i.e., the gap between proof mass 101 and drive electrode DX1 and the gap between proof mass 104 and drive electrode DX4 will become larger and thus the resonant frequency Fx of proof masses 101 and 104 will both increase and be sensed by SX1 and SX4 respectively, while the gap between proof mass 102 and drive electrode DX2 and the gap between proof mass 103 and drive electrode DX3 will become smaller and thus the resonant frequency Fx of proof masses 102 and 103 will both decrease and be sensed by SX2 and SX3 respectively.

Similarly, under an external Y-axis acceleration in the −Y direction, all four proof masses will move in the +Y direction statically while still being driven into resonance The gap between proof mass 101 and drive electrode DY1 and the gap between proof mass 102 and drive electrode DY2 will become smaller. Due to $K_{electrostatic}$ of proof mass 101 and 104 being proportional to 1/gap^3, the $K_{electrostatic}$ will increase when the gaps become smaller. According to Equation (1), the resonant frequency Fy of proof masses 101 and 102 will both decrease. This resonant frequency change is sensed by SY1 and SY2 respectively. Under the same condition, the gap between proof mass 103 and drive electrode DY3 and the gap between proof mass 104 and drive electrode DY4 will become larger. Due to $K_{electrostatic}$ of proof mass 102 and 103 being proportional to 1/gap^3, the $K_{electrostatic}$ will decrease when the gaps become larger. According to Equation (1), the resonant frequency Fy of proof masses 103 and 104 will both increase. This resonant frequency change is sensed by SY3 and SY4 respectively.

The inverse occurs under an external Y-axis acceleration in the +Y direction, i.e., the gap between proof mass 101 and drive electrode DY1 and the gap between proof mass 102 and drive electrode DY2 will become larger and thus the resonant frequency Fy of proof masses 101 and 102 will both increase and be sensed by sense electrodes SY1 and SY2 respectively, while the gap between proof mass 103 and drive electrode DY3 and the gap between proof mass 104 and drive electrode DY4 will become smaller and thus the resonant frequency Fy of proof masses 103 and 104 will both decrease and be sensed by sense electrodes SY3 and SY4 respectively.

As a result, the resonance frequency of one pair of masses increases while the resonance frequency of the other pair of masses decreases for that particular axis of sensitivity. The relative changes of resonance frequencies in a particular axis of sensitivity will manifest itself as a variation in the combined differential output for that particular axis of sensitivity, which can be sensed in order to provide an accelerometer output signal representative of the acceleration.

Figure 2:
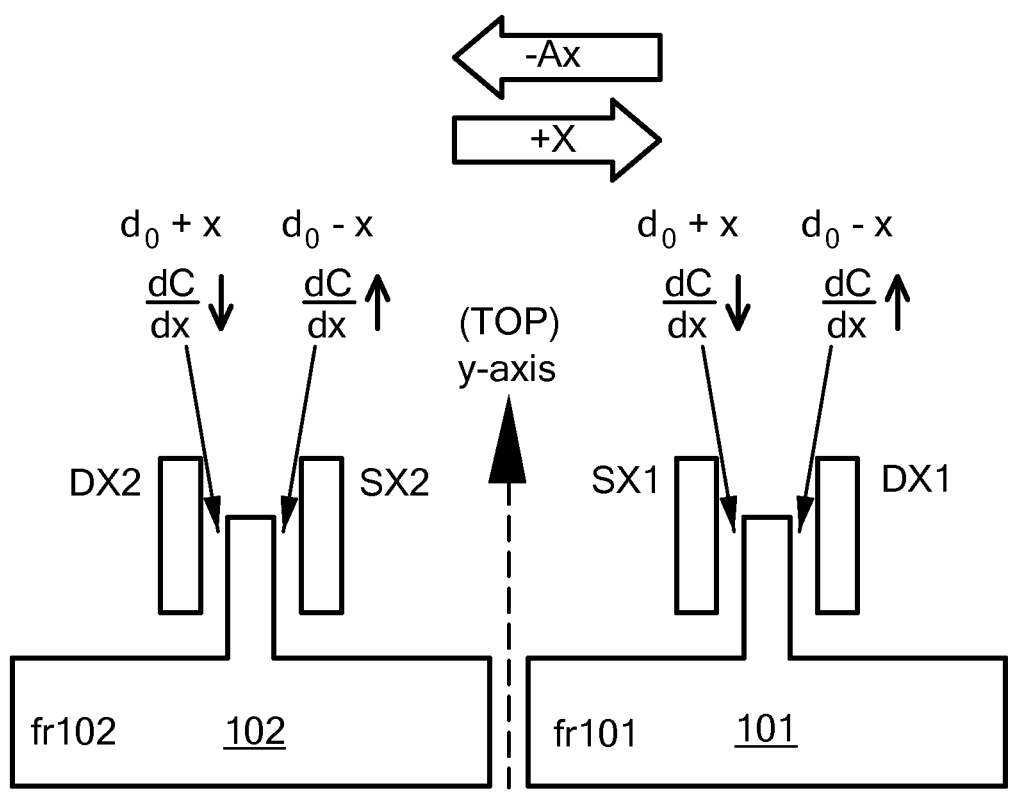
FIG. 2 is a schematic diagram demonstrating the frequency pulling effect for an acceleration in the −X direction (i.e., −Ax) that causes a corresponding displacement of the resonator masses in the +X direction for differential sensing, in accordance with one exemplary embodiment.

FIG. 2 is a schematic diagram demonstrating the frequency pulling effect for an acceleration in the −X direction (i.e., −Ax) that causes a corresponding displacement of the resonator masses in the +X direction for differential sensing, in accordance with one exemplary embodiment. In this example, the frequency pulling effect is explained for one half of the X-axis (i.e., for resonator masses 101 and 102 relative to the electrodes DX1, SX1, DX2 and SX2), although the same effects apply for the other half of the X-axis (i.e., resonator masses 103 and 104 relative to the electrodes DX3, SX3, DX4 and SX4), and similar effects apply for the Y-axis. Because the resonator masses 101 and 102 have weak or no coupling, it is possible that they will have slightly different resonance frequencies. Therefore, resonator mass 101 has a resonance frequency fr101 while resonator mass 102 has a resonance frequency fr102.

The initial capacitance between a given resonator mass and a corresponding electrode can be represented as:

$$C_0 = \frac{\varepsilon A}{d_0}$$

where $d_o$ is the nominal gap between the electrodes and the corresponding finger structure that extends from the corresponding resonator mass.

The rate of change in capacitance when the resonator mass moves by a distance of x (e.g., nanometers) can be represented as:

$$\frac{dC}{dx} = \frac{\varepsilon A}{(d_0 \pm x)^2}$$

The force on a given resonator mass from the corresponding drive electrode due to dC/dx can be represented by:

$$Fd = (\frac{1}{2})(dC/dx)(VDC\_drive - VDC\_body)^2$$

The force on a given resonator mass from the corresponding sense electrode due to dC/dx can be represented by:

$$Fs = (\frac{1}{2})(dC/dx)(VDC\_sense - VDC\_body)^2$$

The electrostatic stiffness due to dC/dx can be represented as:

$$Ke = \frac{\varepsilon A(Vr - V)^2}{(d_0 \pm x)^3}$$

where Vr is the voltage placed on a given electrode and V is the potential placed on the resonator mass.

The total stiffness of the resonator mass at a gap change of x can be represented as (Keq−Ke), where Keq is the initial mechanical stiffness.

The frequency shift due to the change in stiffness can be represented as:

$$fr = f0\sqrt{1 - \frac{Ke}{Keq}}$$

As shown in FIG. 2, an acceleration in the −X direction (i.e., −Ax) causes a corresponding displacement of the resonator masses in the +X direction. The gaps associated with electrodes DX2 and SX1 increase (i.e., to $d_o+x$) and thus dC/dx associated with these electrodes decreases, while the gaps associated with electrodes SX2 and DX1 decrease (i.e., to $d_o-x$) and thus dC/dx associated with these electrodes increases. Consequently, the X-axis resonance frequency fr101 of resonator mass 101 decreases, while the X-axis resonance frequency fr102 of resonator mass 102 increases.

The resonance frequency of resonator mass 101 with respect to the SX1 and DX1 electrodes can be represented by:

$$fr101\_SX1(Gee) := f0 \cdot \sqrt{1 - \frac{1}{Keq}\left[\frac{\varepsilon 0 \cdot As \cdot (Vres - Vs)^2}{(d0 + \text{gap}(Gee\ g))^3}\right]}$$

$$fr101\_DX1(Gee) := f0 \cdot \sqrt{1 - \frac{1}{Keq}\left[\frac{\varepsilon 0 \cdot As \cdot (Vres - Vd)^2}{(d0 - \text{gap}(Gee\ g))^3}\right]}$$

where Gee is the input acceleration (in meters per second-squared), f0 is the nominal resonance frequency of the resonator mass, Vres is the resonator voltage, Vs is the SX voltage, and Vd is the DX voltage.

The resonance frequency of resonator mass 102 with respect to the SX2 and DX2 electrodes can be represented by:

$$fr102\_SX2(Gee) := f0 \cdot \sqrt{1 - \frac{1}{Keq}\left[\frac{\varepsilon 0 \cdot As \cdot (Vres - Vs)^2}{(d0 - \text{gap}(Gee\ g))^3}\right]}$$

$$fr102\_DX2(Gee) := f0 \cdot \sqrt{1 - \frac{1}{Keq}\left[\frac{\varepsilon 0 \cdot As \cdot (Vres - Vd)^2}{(d0 + \text{gap}(Gee\ g))^3}\right]}$$

where Gee is the input acceleration (in meters per second-squared), f0 is the nominal resonance frequency of the resonator mass, Vres is the resonator voltage, Vs is the SX voltage, and Vd is the DX voltage.

The resonance frequency of resonator mass 104 with respect to the SX4 and DX4 electrodes should be the same or nearly the same as those of resonator mass 101.

The resonance frequency of resonator mass 103 with respect to the SX3 and DX3 electrodes should be the same or nearly the same as those of resonator mass 102.

The frequency shift of resonator mass 101 can be represented by:

$$dfr101(Gee) := (fr101\_SX1(0) - fr101\_SX1(Gee)) + (fr101\_DX1(0) - fr101\_DX1(Gee))$$

The frequency shift of resonator mass 102 can be represented by:

$$dfr102(Gee) := (fr102\_SX2(0) - fr102\_SX2(Gee)) + (fr102\_DX2(0) - fr102\_DX2(Gee))$$

The frequency shift of resonator mass 104 should be the same or nearly the same as the frequency shift of resonator 101 and can be represented by:

$$dfr104(Gee) := (fr104\_SX4(0) - fr104\_SX4(Gee)) + (fr104\_DX4(0) - fr104\_DX4(Gee))$$

The frequency shift of resonator mass 103 should be the same or nearly the same as the frequency shift of resonator 102 and can be represented by:

$$dfr\ 103(Gee) := (fr103\_SX3(0) - fr103\_SX3(Gee)) + (fr103\_DX3(0) - fr103\_DX3(Gee))$$

It is worth noting that both the DX electrodes and the SX electrodes contribute to the resonance frequency changes and that the larger the voltage difference between the DX and SX electrodes, the larger the resonance frequency change will be.

Figure 3:
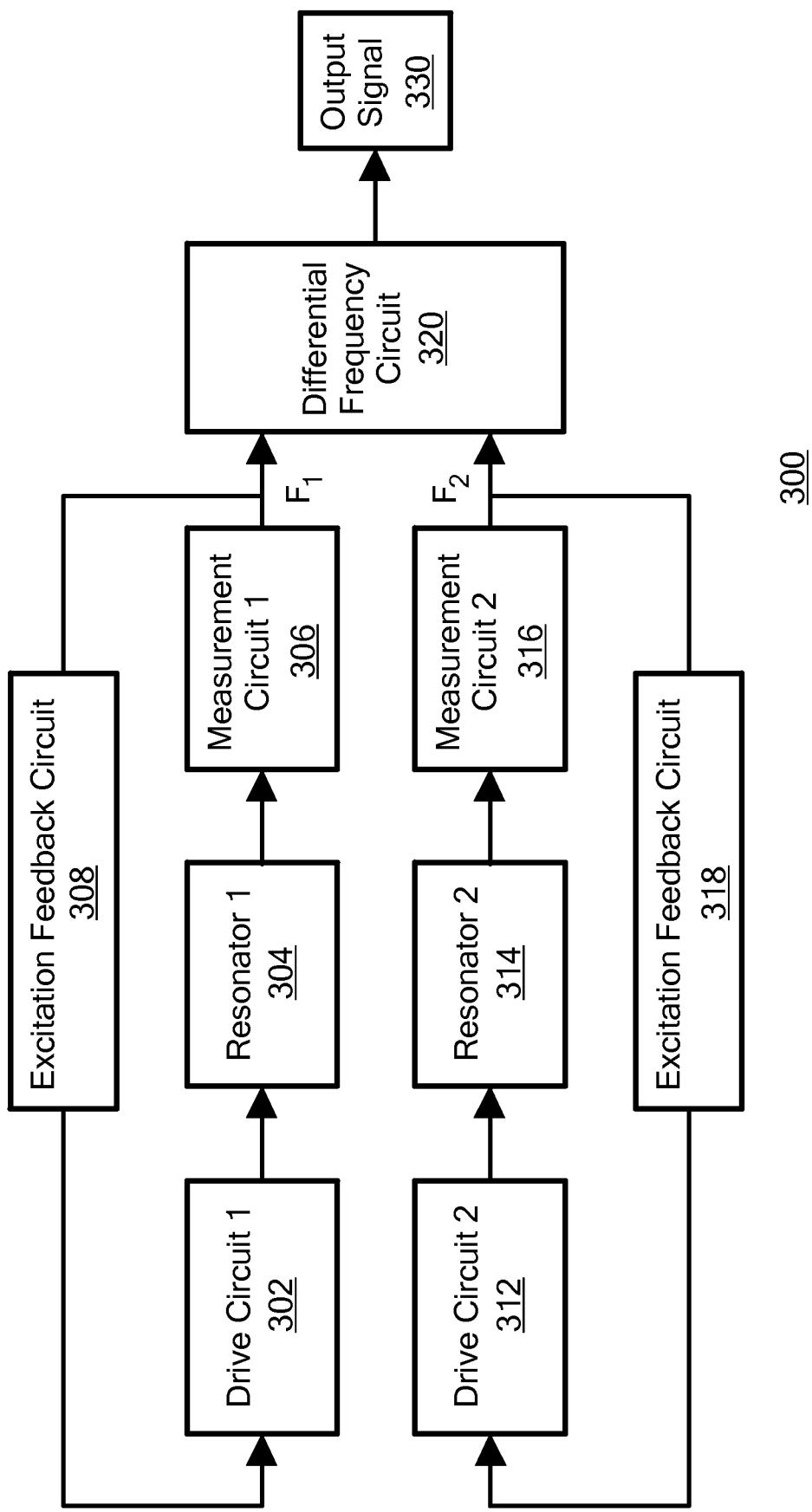
FIG. 3 is a schematic block diagram of an accelerometer control circuit for a single axis for differential sensing, in accordance with one exemplary embodiment.

FIG. 3 is a schematic block diagram of an accelerometer control circuit 300 for a single axis for differential sensing, in accordance with one exemplary embodiment. Among other things, the accelerometer control circuit 300 includes a first drive circuit 302, a first measurement circuit 306, a first excitation feedback circuit 308, a second drive circuit 312, a second measurement circuit 316, a second excitation feedback circuit 318, and a differential frequency circuit 320. Generally speaking, the first and second drive circuits 302 and 312 drive the resonator mass(es) of the first and second resonators 304 and 314, respectively. The excitation feedback circuits 308 and 318 provide control signals to the first and second drive circuits 302 and 312, respectively, based on the signals sensed by the first and second measurement circuits 306 and 316 via the sense electrodes associated with the first and second resonators 304 and 314 in order to maintain resonance of the first and second resonators 304 and 314 at the desired resonance frequencies. The first and second measurement circuits 306 and 316 measure the resonance frequencies $F_1$ and $F_2$ of the first and second resonators 304 and 314, respectively, which, as discussed above, change in opposite directions in the presence of an external acceleration in this exemplary embodiment. The differential frequency circuit 320 provides output signal 330 based on the difference between the measured resonance frequencies of the first and second resonators 304 and 314 from the first and second measurement circuits 306 and 316 (i.e., based on $F_1-F_2$). For example, the output signal 330 may be the difference in resonance frequencies (i.e., $F_1-F_2$) or may be the acceleration computed from the different in resonance frequencies and the scale factor for the particular axis of sensitivity (e.g., if the scale factor of a particular gyroscope is 100 Hz/G and the frequency change is 50 Hz, then the output signal 330 might be 0.5 G).

For example, for the X-axis accelerometer, the first resonator 304 may include resonator masses 101 and 104 while the second resonator 314 may include resonator masses 102 and 103. The first drive circuit 302 provides drive signals to drive electrodes DX1 and DX4 while the second drive circuit 312 provides drive signals to drive electrodes DX2 and DX3. The first measurement circuit 306 measures the resonance frequency of the resonator masses 101 and 104 of the first resonator 304 via sense electrodes SX1 and SX4 while the second measurement circuit 316 measures the resonance frequency of the resonator masses 102 and 103 of the second resonator 314 via sense electrodes SX2 and SX3. The differential frequency circuit 320 provides output signal 330 based on the difference between the measured resonance frequencies of the first and second resonators 304 and 314 from the first and second measurement circuits 306 and 316.

Similarly, for the Y-axis accelerometer, the first resonator 304 may include resonator masses 101 and 102 while the second resonator 314 may include resonator masses 103 and 104. The first drive circuit 302 provides drive signals to drive electrodes DY1 and DY2 while the second drive circuit 312 provides drive signals to drive electrodes DY3 and DY4. The first measurement circuit 306 measures the resonance frequency of the resonator masses 101 and 102 of the first resonator 304 via sense electrodes SY1 and SY2 while the second measurement circuit 316 measures the resonance frequency of the resonator masses 103 and 104 of the second resonator 314 via sense electrodes SY3 and SY4. The differential frequency circuit 320 provides output signal 330 based on the difference between the measured resonance frequencies of the first and second resonators 304 and 314 from the first and second measurement circuits 306 and 316.

Thus, exemplary embodiments typically include a separate accelerometer control circuit 300 for each axis of sensitivity.

In exemplary embodiments, each resonator mass may be supported by a number of folded-spring type flexures configured to allow each mass to move in both the x-axis and y-axis directions. For example, during one phase of operation, resonator mass 101 moves up and toward the right, resonator mass 102 moves up and toward the left, resonator mass 103 moves down and toward the left, and resonator mass 104 moves down and toward the right (i.e., all of the masses are moving away from the center in both the x-axis and y-axis directions), while during another phase of operation, resonator mass 101 moves down and toward the left, resonator mass 102 moves down and toward the right, resonator mass 103 moves up and toward the right, and resonator mass 104 moves up and toward the left (i.e., all of the masses are moving toward the center in both the x-axis and y-axis directions). The flexures may be configured such that resonator masses 101 and 104 move in sync with one another in the x-axis direction, resonator masses 102 and 103 move in sync with one another in the x-axis direction, resonator masses 101 and 102 move in sync with one another in the y-axis direction, and resonator masses 103 and 104 move in sync with one another in the y-axis direction.

In exemplary embodiments, each drive/sense electrode may include a set of elongated fingers that interdigitate with corresponding fingers extending from the corresponding resonator mass. Such interdigitated electrostatic transducers are well-known in the art.

Single-Ended X/Y Axis Sensing with Strong Coupling

Figure 4:
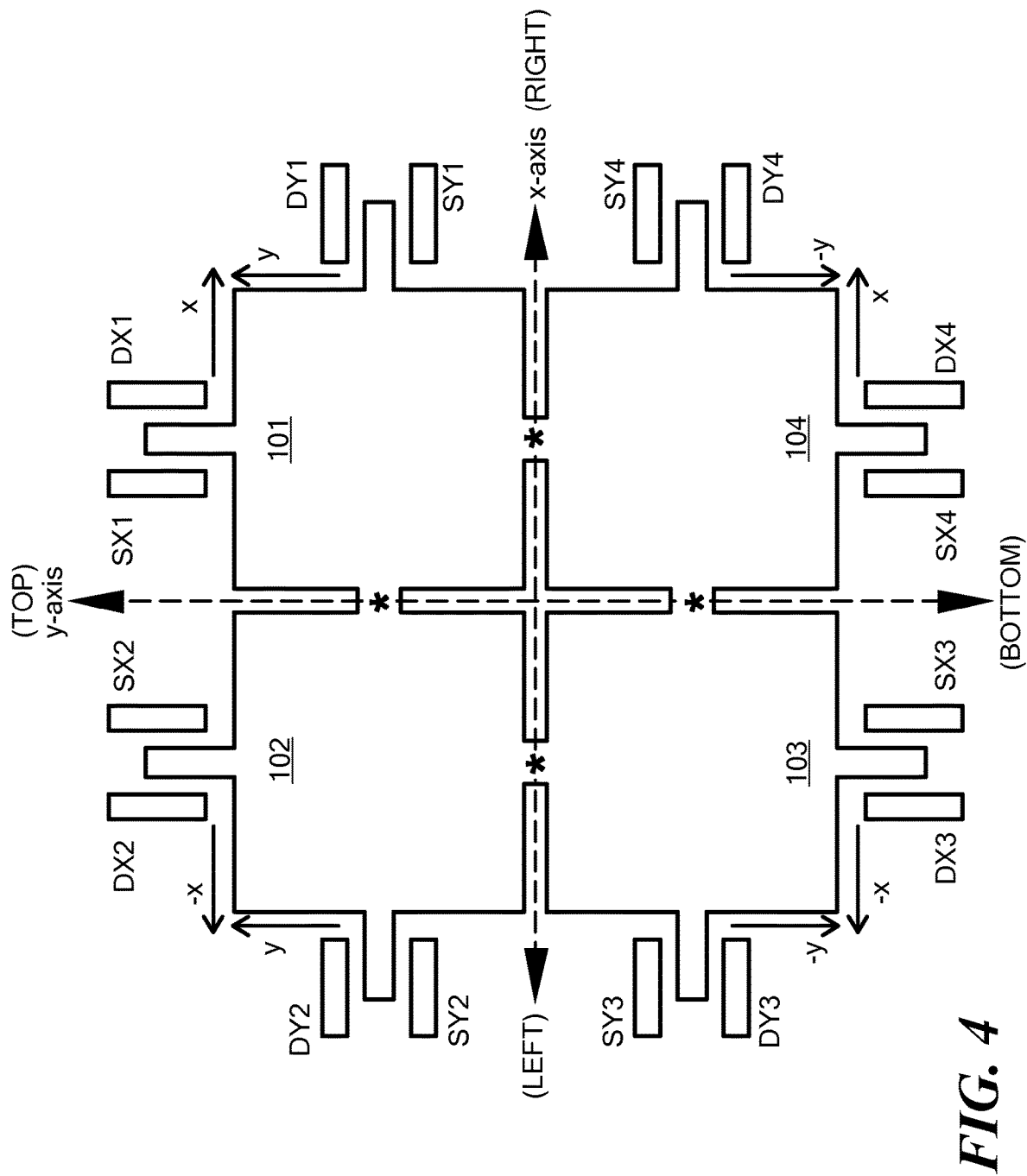
FIG. 4 is a schematic top view diagram of device layer structures for an X-Y axis resonant accelerometer using anti-phase drive and single-ended X/Y axis sensing with strong coupling of the resonator masses, in accordance with one exemplary embodiment of the present invention.

FIG. 4 is a schematic top view diagram of device layer structures for an X-Y axis resonant accelerometer using anti-phase drive and single-ended X/Y axis sensing with strong coupling of the resonator masses, in accordance with one exemplary embodiment of the present invention. In this exemplary operating mode, the resonator masses and electrodes are configuration substantially as shown in FIG. 1, but with strong mechanical coupling of the resonator masses (e.g., by one or more tethers labeled "*" between each pair of adjacent resonator masses) so that the four resonator masses effectively operate as a single body having one resonance frequency per axis of sensitivity, e.g., a single x-axis resonance frequency and a single y-axis resonance frequency. Single-ended sensing is used to produce an accelerometer output for each axis of sensitivity based on resonance frequency changes caused by the frequency pulling effect in the presence of an external acceleration, where the entire body undergoes a change in resonance frequency in the presence of such external acceleration. The change in resonance frequency, and hence the magnitude of the external acceleration, can be determined by comparing the resonance frequency of the body to a reference frequency.

For the x-axis motions in one exemplary embodiment, resonator masses 101-104 are alternately driven by drive electrodes DX1/DX4 and DX2/DX3 to move back-and-forth in-phase with one another. During one phase of x-axis motion, resonator masses 101-104 move toward the right (i.e., in the "x" direction), and during the anti-phase of x-axis motion, resonator masses 101-104 move toward the left (i.e., in the "−x" direction).

For the y-axis motions in one exemplary embodiment, resonator masses 101-104 are alternately driven by drive electrodes DY1/DY2 and DY3/DY4 to move back-and-forth in-phase with one another. During one phase of y-axis motion, resonator masses 101-104 move toward the top (i.e., in the "y" direction), and during the anti-phase of y-axis motion, resonator masses 101-104 move toward the bottom (i.e., in the "−y" direction).

As mentioned above, the resonator masses may be configured to resonate such that the x-axis resonance frequency and the y-axis resonance frequency are substantially different, e.g., to help with mitigation of mode injection and locking issues.

An acceleration in a particular direction acts on all four resonator masses and effectively changes the electrostatic gaps between the four masses and the drive/sense electrodes associated with that particular axis of sensitivity, which in turn effectively changes the electrostatic spring stiffness of the resonator mass, which in turn effectively changes the resonance frequencies of the resonator masses. For convenience, the four coupled resonator masses may be referred to herein as a "resonator" such that the accelerometer can be considered as having one resonator for each axis of sensitivity.

The resonance frequency of the single resonator can be sensed, and an output signal can be generated based on the difference between the sensed resonance frequency and a reference frequency. Generally speaking, the relation between input acceleration and the change in resonance frequencies is expressed in Hz/G (e.g., a particular accelerometer might be designed to operate with a scale factor of, say, 50 Hz/G or 100 Hz/G). Thus, the input acceleration (in terms of G force) can be determined by the change in resonance frequencies (in Hz) based on the scale factor. Different axes of sensitivity may have the same scale factor or may have different scale factors.

In order to operate the resonant accelerometer in this exemplary embodiment, the resonator masses, the drive electrodes, and the sense electrodes must be placed at different electrical potentials. For example, the resonator masses may be placed at a fixed potential (referred to herein as VDC_body) which may be a non-zero voltage or ground. The drive electrodes associated with a particular axis of sensitivity may be biased with a high DC bias voltage (referred to herein as VDC_driveX for the x-axis and VDC_driveY for the y-axis) plus a small AC voltage (referred to as VAC_driveX for the x-axis and VAC_driveY for the y-axis), i.e., the drive electrodes DX1, DX2, DX3 and DX4 are biased with VDC_driveX+VAC_driveX to excite the x-axis movements of the resonator masses 101-104 and the drive electrodes DY1, DY2, DY3 and DY4 are biased with VDC_driveY+VAC_driveY to excite the y-axis movements of the resonator masses 101-104. The sense electrodes associated with a particular axis of sensitivity may be biased with a different DC bias voltage (referred to herein as VDC_senseX for the x-axis and VDC_senseY for the y-axis) plus a small AC voltage (referred to as VAC_senseX for the x-axis and VAC_senseY for the y-axis) corresponding to the axis of sensitivity, i.e., sense electrodes SX1, SX2, SX3 and SX4 are biased with VDC_senseX+VAC_senseX and the sense electrodes SY1, SY2, SY3 and SY4 are biased with VDC_senseY+VAC_senseY. Importantly, VDC_driveX and VDC_senseX are unequal from one another and also from VDC_body, and VDC_driveY and VDC_senseY are unequal from one another and also from VDC_body. In various alternative embodiments, VDC_driveX may be equal or unequal to VDC_driveY, VDC_senseX may be equal or unequal to VDC_senseY, and VAC_driveX may be equal or unequal to VAC_driveY. In this exemplary embodiment, VAC_driveX and VAC_senseX are 180 degrees out of phase with one another, and VAC driveY and VAC_senseY are 180 degrees out of phase with one another. For the sake of simplicity, VAC_driveX and VAC_senseX may have the same amplitude as one another and VAC_driveY and VAC_senseY may have the same amplitude as one another, although the amplitudes can be different in alternative embodiments.

X-axis motions of the resonator masses 101-104 are sensed through varying capacitance between each resonator mass 101-104 and its corresponding sense electrode SX1-SX4. The varying capacitance induces a correspondingly varying current on the sense electrode. The sensed currents can be used both as feedback signals (e.g., via phased-lock loop) for driving the X-axis motions of the resonator masses and to sense the resonance frequency of the resonating body.

Similarly, Y-axis motions of the resonator masses 101-104 are sensed through varying capacitance between each resonator mass 101-104 and its corresponding sense electrode SY1-SY4. The varying capacitance induces a correspondingly varying current on the sense electrode. The sensed currents can be used both as feedback signals (e.g., via phased-lock loop) for driving the Y-axis motions of the resonator masses and to sense the resonance frequency of the resonating body.

Under an external acceleration with respect to a given axis of sensitivity, all four resonator masses will move in the opposite direction with respect to that axis of sensitivity. Due to a frequency pulling effect, the resonating body will undergo a change in resonance frequency. The resonance frequency of the resonating body can be sensed via the sense electrodes, and an output signal can be produced based on the difference between the sensed resonance frequency and a reference frequency.

Thus, for example, under an external X-axis acceleration in the −X direction, all four proof masses will move in the +X direction statically while still being driven into resonance. The gap between proof mass 101 and drive electrode DX1 and the gap between proof mass 104 and drive electrode DX4 will become smaller. Under the same condition, the gap between proof mass 102 and drive electrode DX2 and the gap between proof mass 103 and drive electrode DX3 will become larger.

The inverse occurs under an external X-axis acceleration in the +X direction, i.e., the gap between proof mass 101 and drive electrode DX1 and the gap between proof mass 104 and drive electrode DX4 will become larger, while the gap between proof mass 102 and drive electrode DX2 and the gap between proof mass 103 and drive electrode DX3 will become smaller.

Similarly, under an external Y-axis acceleration in the −Y direction, all four proof masses will move in the +Y direction statically while still being driven into resonance. The gap between proof mass 101 and drive electrode DY1 and the gap between proof mass 102 and drive electrode DY2 will become smaller. Under the same condition, the gap between proof mass 103 and drive electrode DY3 and the gap between proof mass 104 and drive electrode DY4 will become larger.

The inverse occurs under an external Y-axis acceleration in the +Y direction, i.e., the gap between proof mass 101 and drive electrode DY1 and the gap between proof mass 102 and drive electrode DY2 will become larger, while the gap between proof mass 103 and drive electrode DY3 and the gap between proof mass 104 and drive electrode DY4 will become smaller.

Figure 5:
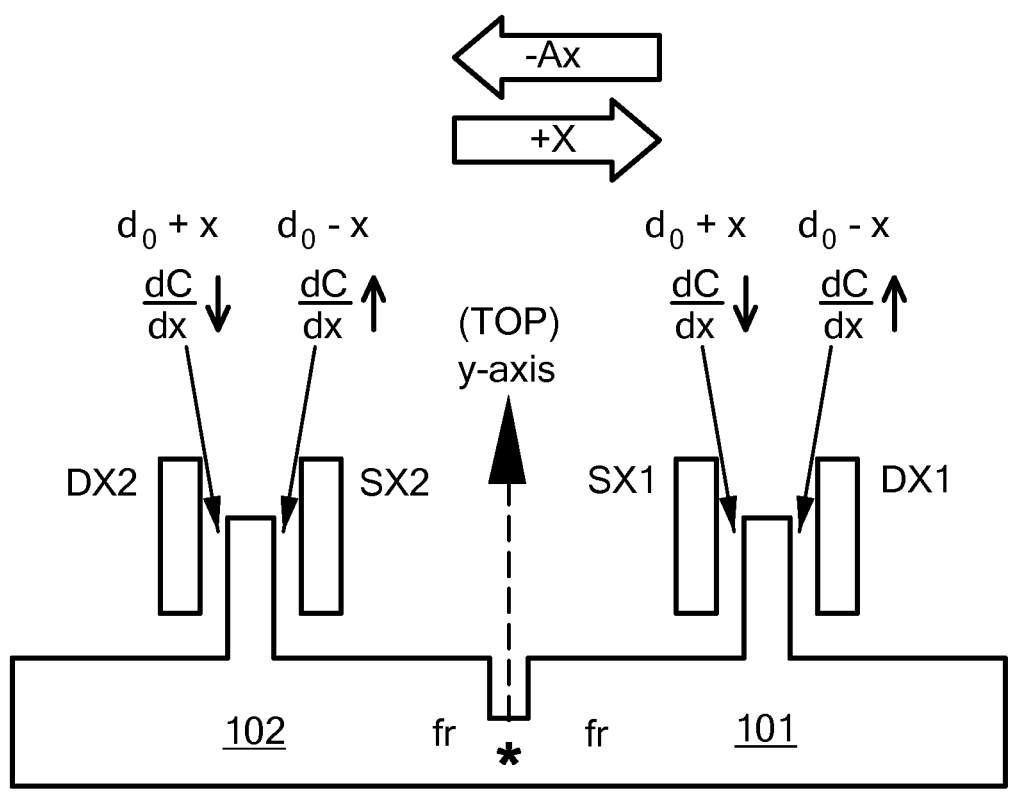
FIG. 5 is a schematic diagram demonstrating the frequency pulling effect for an acceleration in the −X direction (i.e., −Ax) that causes a corresponding displacement of the resonator masses in the +X direction for single-ended sensing, in accordance with the exemplary embodiment of FIG. 4.

As a result, the resonance frequency of the resonating body changes. FIG. 5 is a schematic diagram demonstrating the frequency pulling effect for an acceleration in the −X direction (i.e., −Ax) that causes a corresponding displacement of the resonator masses in the +X direction for single-ended sensing, in accordance with one exemplary embodiment. In this example, the frequency pulling effect is explained for one half of the X-axis (i.e., for resonator masses 101 and 102 relative to the electrodes DX1, SX1, DX2 and SX2), although the same effects apply for the other half of the X-axis (i.e., resonator masses 103 and 104 relative to the electrodes DX3, SX3, DX4 and SX4), and similar effects apply for the Y-axis. Because the resonator masses 101-104 have strong coupling in this exemplary embodiment, each resonator mass will have the same resonance frequency (represented as "fr" in FIG. 5).

The initial capacitance between a given resonator mass and a corresponding electrode can be represented as:

$$C_0 = \frac{\varepsilon A}{d_0}$$

where $d_o$ is the nominal gap between the electrodes and the corresponding finger structure that extends from the corresponding resonator mass.

The rate of change in capacitance when the resonator mass moves by a distance of x (e.g., nanometers) can be represented as:

$$\frac{dC}{dx} = \frac{\varepsilon A}{(d_0 \pm x)^2}$$

The force on a given resonator mass from the corresponding drive electrode due to dC/dx can be represented by:

$$Fd = (½)(dC/dx)(VDC\_drive - VDC\_body)^2$$

The force on a given resonator mass from the corresponding sense electrode due to dC/dx can be represented by:

$$Fs = (½)(dC/dx)(VDC\_sense - VDC\_body)^2$$

The electrostatic stiffness due to dC/dx can be represented as:

$$Ke = \frac{\varepsilon A (Vr - V)^2}{(d_0 \pm x)^3}$$

where Vr is the voltage placed on a given electrode and V is the potential placed on the resonator mass.

The total stiffness of the resonator mass at a gap change of x can be represented as (Keq−Ke), where Keq is the initial mechanical stiffness.

The frequency shift due to the change in stiffness can be represented as:

$$fr = f0 \sqrt{1 - \frac{Ke}{Keq}}$$

As shown in FIG. 5, an acceleration in the −X direction (i.e., −Ax) causes a corresponding displacement of the resonator masses in the +X direction. The gaps associated with electrodes DX2 and SX1 increase (i.e., to $d_o + x$) and thus dC/dx associated with these electrodes decreases, while the gaps associated with electrodes SX2 and DX1 decrease (i.e., to $d_o - x$) and thus dC/dx associated with these electrodes increases. Consequently, the X-axis resonance frequency fr of resonator mass 101 decreases, and the X-axis resonance frequency fr of resonator mass 102 also decreases.

The resonance frequency fr with respect to the SX1 and SX2 electrodes can be represented by:

$$frSX1(Gee) := f0 \cdot \sqrt{1 - \frac{1}{Keq}\left[\frac{\varepsilon 0 \cdot As \cdot (Vres - Vs)^2}{(d0 + \text{gap}(Gee\ g))^3}\right]}$$

$$frSX2(Gee) := f0 \cdot \sqrt{1 - \frac{1}{Keq}\left[\frac{\varepsilon 0 \cdot As \cdot (Vres - Vd)^2}{(d0 - \text{gap}(Gee\ g))^3}\right]}$$

where Gee is the input acceleration (in meters per second-squared), f0 is the nominal resonance frequency of the resonator mass, Vres is the resonator voltage, and Vs is the SX voltage.

The resonance frequency fr with respect to the DX1 and DX2 electrodes can be represented by:

$$frDX1(Gee) := f0 \cdot \sqrt{1 - \frac{1}{Keq}\left[\frac{\varepsilon 0 \cdot As \cdot (Vres - Vd)^2}{(d0 - \text{gap}(Gee\ g))^3}\right]}$$

$$frDX2(Gee) := f0 \cdot \sqrt{1 - \frac{1}{Keq}\left[\frac{\varepsilon 0 \cdot As \cdot (Vres - Vd)^2}{(d0 + \text{gap}(Gee\ g))^3}\right]}$$

where Gee is the input acceleration (in meters per second-squared), f0 is the nominal resonance frequency of the resonator mass, Vres is the resonator voltage, and Vd is the DX voltage.

The resonance frequencies fr with respect to the SX4 and DX4 electrodes should be the same or nearly the same as those of the SX1 and DX1 electrodes.

The resonance frequency fr with respect to the SX3 and DX3 electrodes should be the same or nearly the same as those of the SX2 and DX2 electrodes.

The frequency shift contribution of the SX electrodes can be represented by:

$$dfrSX(Gee) := (frSX1(0) - frSX1(Gee)) + (frSX2(0) - frSX2(Gee)) +$$
$$(frSX3(0) - frSX3(Gee)) + (frSX4(0) - frSX4(Gee))$$

The frequency shift contribution of the DX electrodes can be represented by:

$$dfrDX(Gee) := (frDX1(0) - frDX1(Gee)) + (frDX2(0) - frDX2(Gee)) +$$
$$(frDX3(0) - frDX3(Gee)) + (frDX4(0) - frDX4(Gee))$$

The total X-axis frequency shift at an input acceleration of Gee can be represented by:

$$dfrX(Gee) := dfrDX(Gee) + dfrSX(Gee)$$

It is worth noting that both the DX electrodes and the SX electrodes contribute to the resonance frequency changes and that the larger the voltage difference between the DX and SX electrodes, the larger the resonance frequency change will be.

Figure 6:
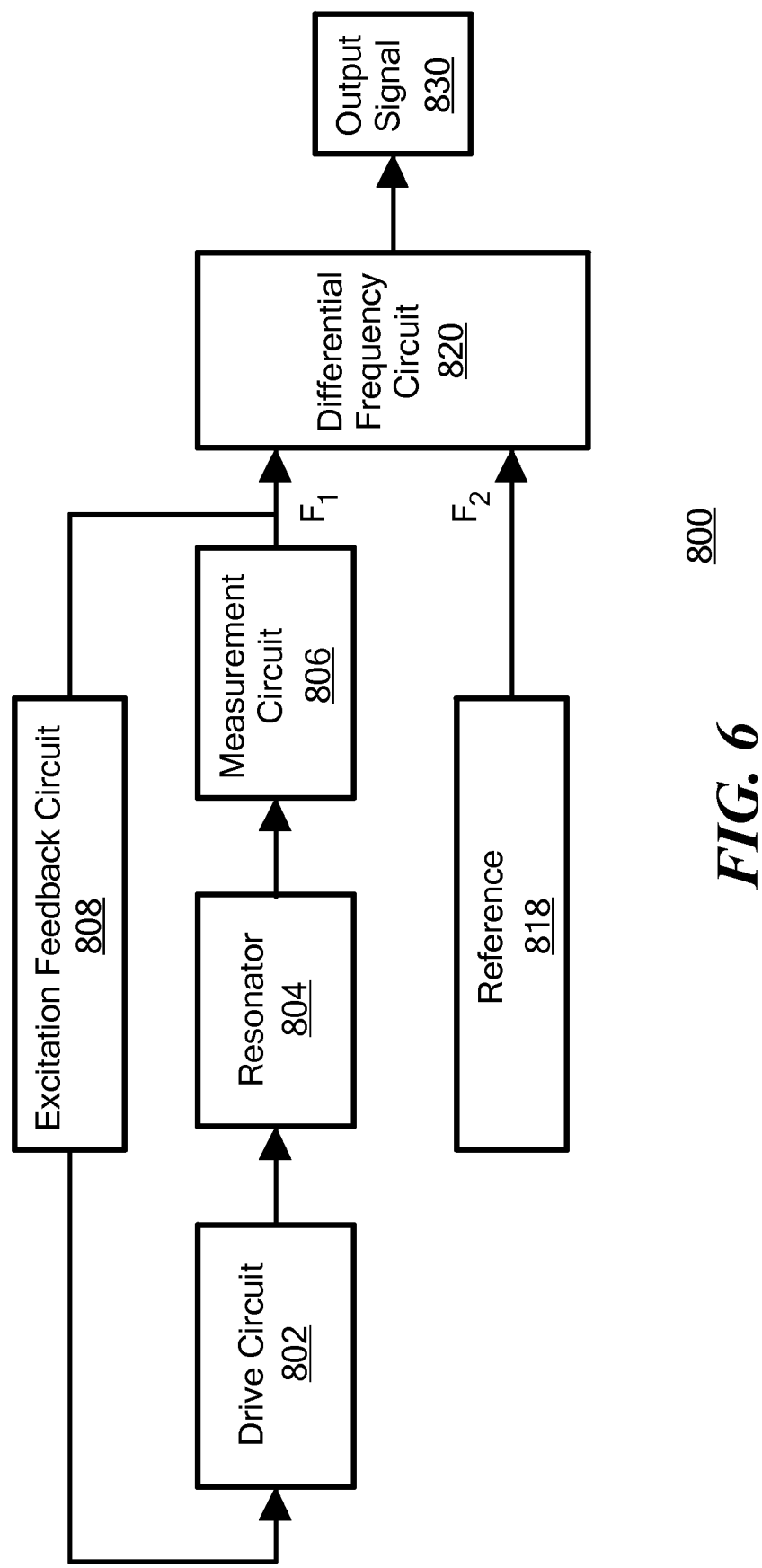
FIG. 6 is a schematic block diagram of an accelerometer control circuit 800 for a single axis of single-ended sensing, in accordance with one exemplary embodiment.

FIG. 6 is a schematic block diagram of an accelerometer control circuit 800 for a single axis of single-ended sensing, in accordance with one exemplary embodiment. Among other things, the accelerometer control circuit 800 includes a drive circuit 802, a measurement circuit 806, an excitation feedback circuit 808, a reference frequency circuit 818, and a differential frequency circuit 820. Generally speaking, the drive circuit 802 drives the resonator masses of the resonator 804. The excitation feedback circuit 808 provides control signals to the drive circuit 802 based on the signals sensed by the measurement circuit 806 via the sense electrodes in order to maintain resonance of the resonator mass at the desired resonance frequency. The measurement circuit 806 measures the resonance frequency $F_1$ of the resonator 804, which, as discussed above, changes in the presence of an external acceleration. The differential frequency circuit 820 provides output signal 830 based on the difference between the measured resonance frequency of resonator from the measurement circuit 806 and a reference frequency provided by reference frequency circuit 818 (i.e., based on $F_1-F_2$). For example, the output signal 330 may be the difference in resonance frequencies (i.e., $F_1-F_2$) or may be the acceleration computed from the different in resonance frequencies and the scale factor for the particular axis of sensitivity (e.g., if the scale factor of a particular gyroscope is 100 Hz/G and the frequency change is 50 Hz, then the output signal 330 might be 0.5 G). Exemplary embodiments typically include a separate accelerometer control circuit 800 for each axis of sensitivity.

Figure 7:
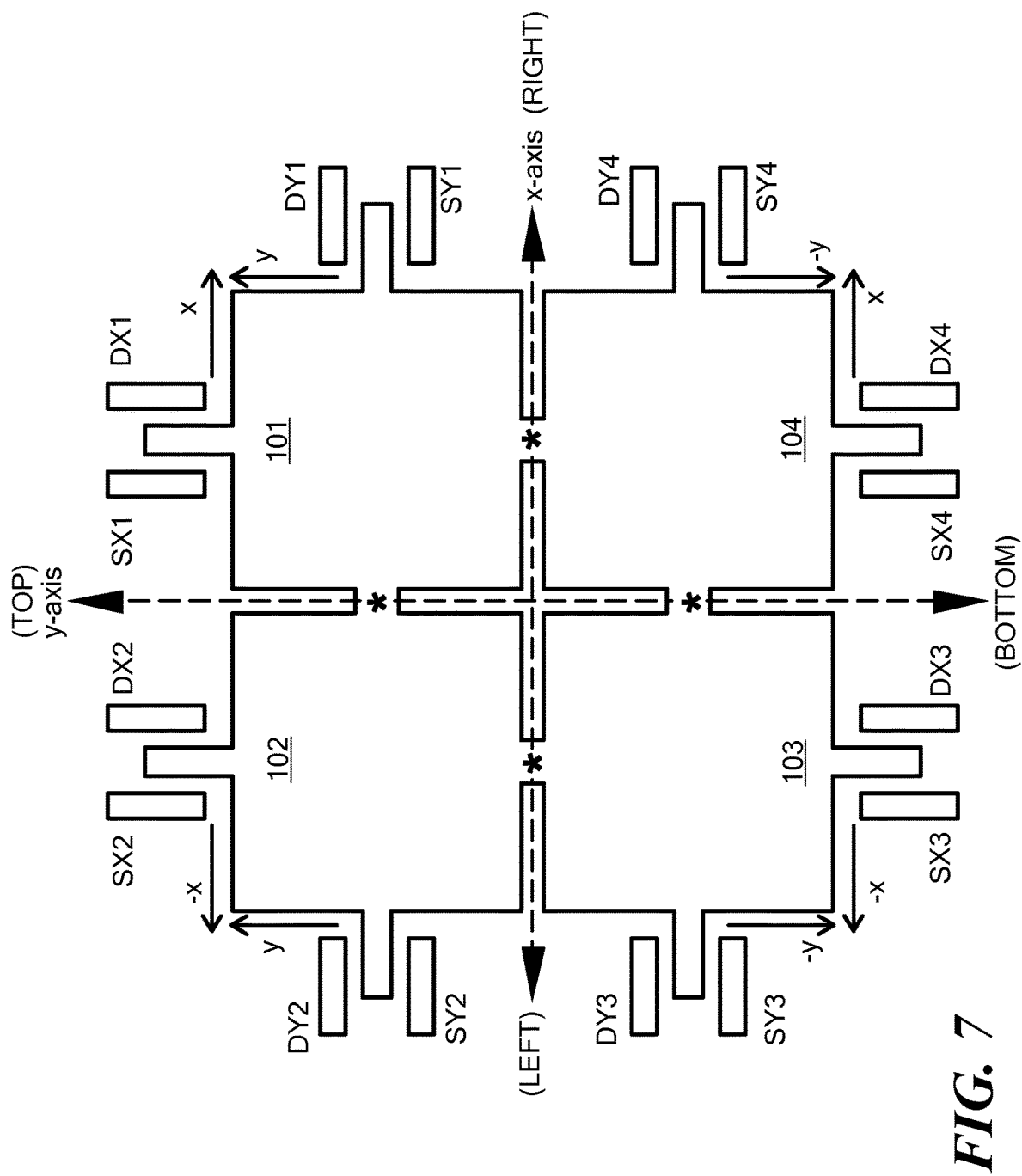
FIG. 7 is a schematic top view diagram of device layer structures for an X-Y axis resonant accelerometer using in-phase drive and single-ended X/Y axis sensing with strong coupling of the resonator masses, in accordance with one exemplary embodiment of the present invention.

FIG. 7 is a schematic top view diagram of device layer structures for an X-Y axis resonant accelerometer using in-phase drive and single-ended X/Y axis sensing with strong coupling of the resonator masses, in accordance with one exemplary embodiment of the present invention. Like the exemplary embodiment described above with reference to FIGS. 4-6, the resonator masses have strong mechanical coupling (e.g., by one or more tethers labeled "*" between each pair of adjacent resonator masses) so that the four resonator masses effectively operate as a single body having one resonance frequency per axis of sensitivity, e.g., a single x-axis resonance frequency and a single y-axis resonance frequency. Single-ended sensing is used to produce an accelerometer output for each axis of sensitivity based on resonance frequency changes caused by the frequency pulling effect in the presence of an external acceleration, where the entire body undergoes a change in resonance frequency in the presence of such external acceleration. The change in resonance frequency, and hence the magnitude of the external acceleration, can be determined by comparing the resonance frequency of the body to a reference frequency.

For the x-axis motions in one exemplary embodiment, resonator masses 101-104 are driven by drive electrodes DX1-DX4 to move back-and-forth in-phase with one another. In this example, the movements of resonator masses 101-104 can be accomplished by driving drive electrodes DX1, DX2, DX3, and DX4 in-phase with one another, i.e., with the same drive signal applied to all of these drive electrodes. During one phase of x-axis motion, resonator masses 101-104 move toward the right (i.e., in the "x" direction), and during the anti-phase of x-axis motion, resonator masses 101-104 move toward the left (i.e., in the "-x" direction).

For the y-axis motions in one exemplary embodiment, resonator masses 101-104 are driven by drive electrodes DY1-DY4 to move back-and-forth in-phase with one another. In this example, the movements of resonator masses 101-104 can be accomplished by driving drive electrodes DY1, DY2, DY3, and DY4 in-phase with one another, i.e., with the same drive signal applied to all of these drive electrodes. During one phase of y-axis motion, resonator masses 101-104 move toward the top (i.e., in the "y" direction), and during the anti-phase of y-axis motion, resonator masses 101-104 move toward the bottom (i.e., in the "-y" direction).

As mentioned above, the resonator masses may be configured to resonate such that the x-axis resonance frequency and the y-axis resonance frequency are substantially different, e.g., to help with mitigation of mode injection and locking issues.

Under an external acceleration with respect to a given axis of sensitivity, all four resonator masses will move in the opposite direction with respect to that axis of sensitivity. Due to a frequency pulling effect, the resonating body will undergo a change in resonance frequency. The resonance frequency of the resonating body can be sensed via the sense electrodes, and an output signal can be produced based on the difference between the sensed resonance frequency and a reference frequency.

Thus, for example, under an external X-axis acceleration in the −X direction, all four proof masses will move in the +X direction statically while still being driven into resonance. The gap between each proof mass and its corresponding X-axis drive electrode will become smaller, while the gap between each proof mass and its corresponding X-axis sense electrode will become larger.

The inverse occurs under an external X-axis acceleration in the +X direction, i.e., the gap between each proof mass and its corresponding X-axis drive electrode will become larger, while the gap between each proof mass and its corresponding X-axis sense electrode will become smaller.

Similarly, under an external Y-axis acceleration in the −Y direction, all four proof masses will move in the +Y direction statically while still being driven into resonance The gap between each proof mass and its corresponding Y-axis drive electrode will become smaller, while the gap between each proof mass and its corresponding Y-axis sense electrode will become larger.

The inverse occurs under an external Y-axis acceleration in the +Y direction, i.e., the gap between each proof mass and its corresponding Y-axis drive electrode will become larger, while the gap between each proof mass and its corresponding Y-axis sense electrode will become smaller.

Figure 8:
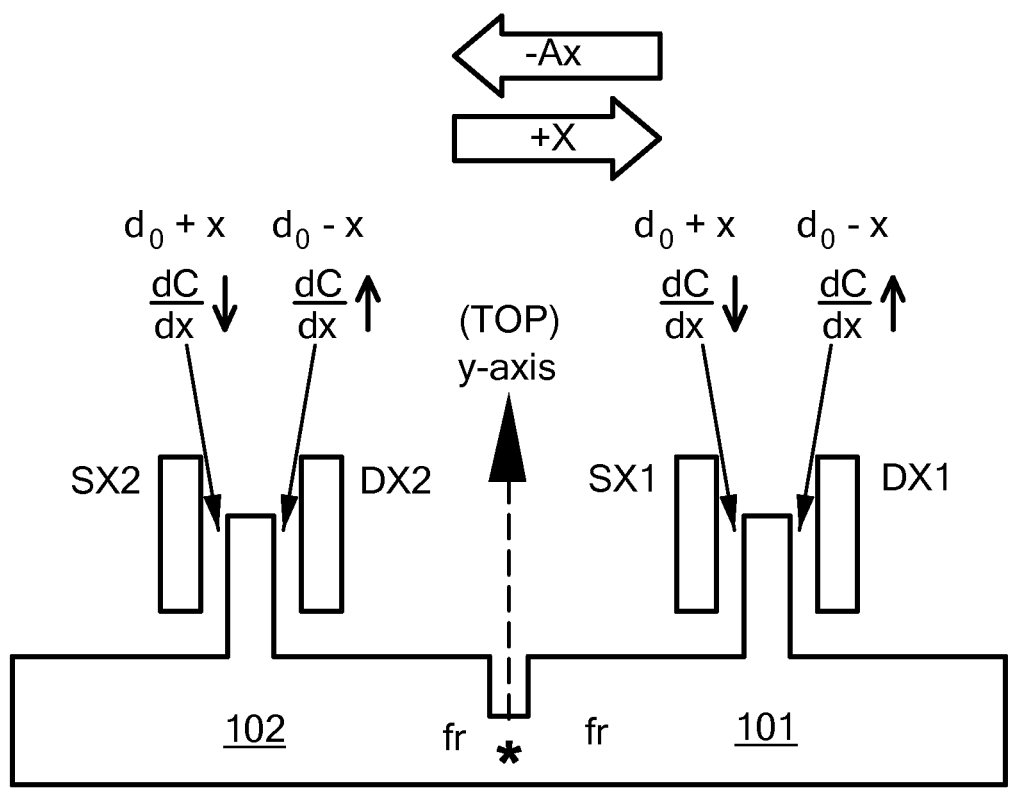
FIG. 8 is a schematic diagram demonstrating the frequency pulling effect for an acceleration in the −X direction (i.e., −Ax) that causes a corresponding displacement of the resonator masses in the +X direction for single-ended sensing, in accordance with the exemplary embodiment of FIG. 7.

As a result, the resonance frequency of the resonating body changes. FIG. 8 is a schematic diagram demonstrating the frequency pulling effect for an acceleration in the −X direction (i.e., −Ax) that causes a corresponding displacement of the resonator masses in the +X direction for single-ended sensing, in accordance with the exemplary embodiment of FIG. 7. In this example, the frequency pulling effect is explained for one half of the X-axis (i.e., for resonator masses 101 and 102 relative to the electrodes DX1, SX1, DX2 and SX2), although the same effects apply for the other half of the X-axis (i.e., resonator masses 103 and 104 relative to the electrodes DX3, SX3, DX4 and SX4), and similar effects apply for the Y-axis. Because the resonator masses 101-104 have strong coupling in this exemplary embodiment, each resonator mass will have the same resonance frequency (represented as "fr" in FIG. 8).

As shown in FIG. 8, an acceleration in the −X direction (i.e., −Ax) causes a corresponding displacement of the resonator masses in the +X direction. The gaps associated with electrodes SX1 and SX2 increase (i.e., to $d_o+x$) and thus dC/dx associated with these electrodes decreases, while the gaps associated with electrodes DX1 and DX2 decrease (i.e., to $d_o$31 x) and thus dC/dx associated with these electrodes increases. Consequently, the X-axis resonance frequency fr of resonator mass 101 decreases, and the X-axis resonance frequency fr of resonator mass 102 also decreases.

In this example using in-phase drive, the resonance frequency should be the same for all drive electrodes DX1-DX4, and the resonance frequency should be the same for all sense electrodes SX1-SX4. The resonance frequency change can be determined differentially substantially as discussed above with reference to FIGS. 4-6.

Z-Axis Sensing

In various exemplary embodiments, a multiple-axis resonant accelerometer also includes Z-axis sensing. For such Z-axis sensing, the multiple-axis resonant accelerometer includes at least one Z-axis sensor element, where each Z-axis sensor element is part of a distinct resonator mass and moves along with the remainder of the resonator mass in the X-axis and Y-axis directions but also is configured to resonate up-and-down in the Z-axis (i.e., out-of-plane) direction when driven by a set of drive electrodes underlying and/or overlying the Z-axis sensor element(s). Out-of-plane motions of the Z-axis sensor element(s) are sensed using a set of sense electrodes underlying and/or overlying the Z-axis sensor element(s). Signals from the Z-axis sense electrodes are combined to produce the Z-axis output signal of the accelerometer. As with the X-axis and Y-axis sensors discussed above, the Z-axis sensor can be operated using differential sensing or single-ended sensing.

In certain exemplary embodiments, the Z-axis sensor elements are teeter-totter elements that are configured to resonate with a "teeter-totter" of "see-saw" motion, although alternative embodiments may use other Z-axis sensor element configurations including configurations in which the entire resonator mass resonates in the Z-axis direction. In certain exemplary embodiments, the teeter-totter elements are large and constitute most of the moving mass of the resonator masses for the x-axis and y-axis motions.

Figure 9:
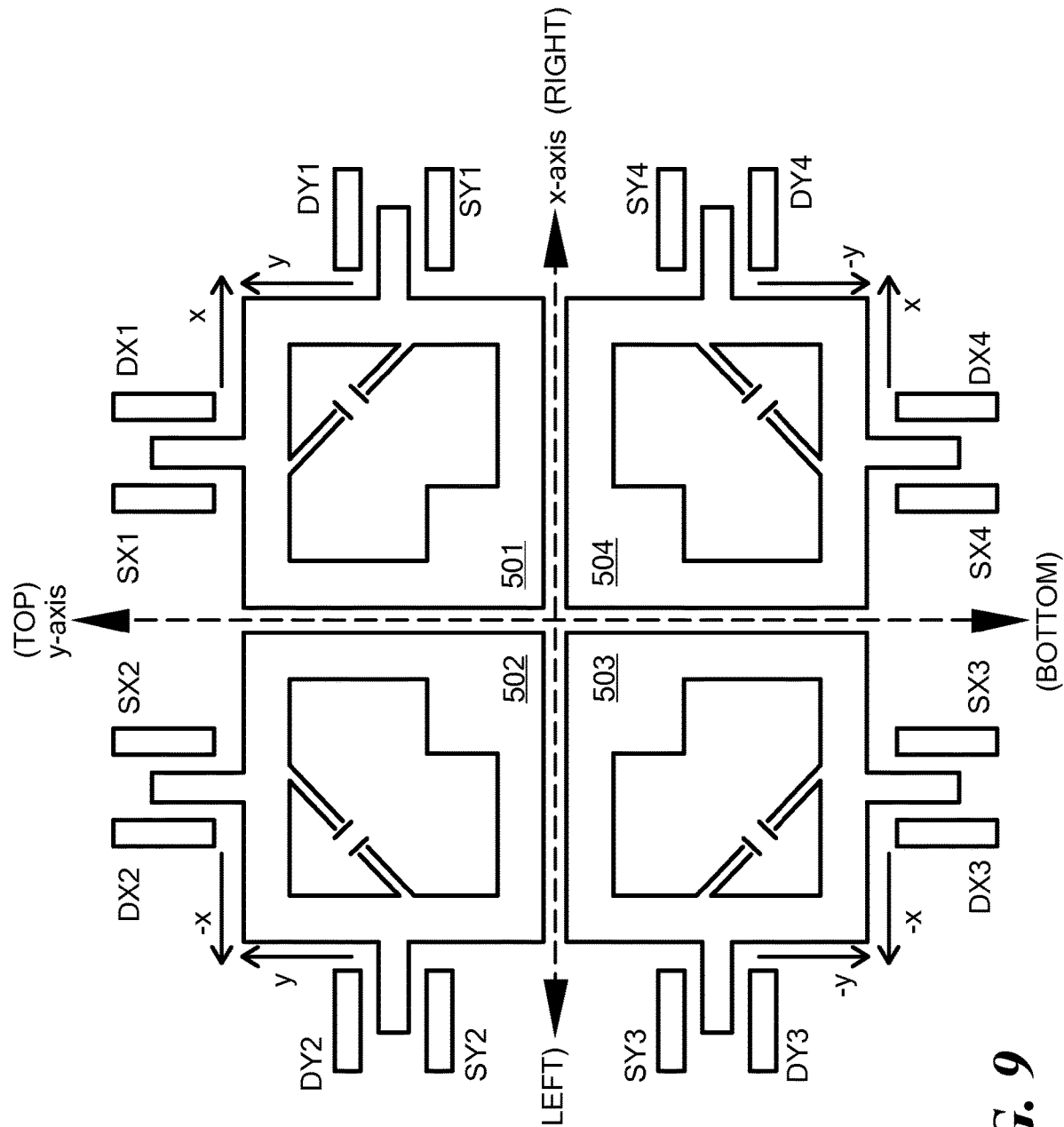
FIG. 9 is a schematic top view diagram of device layer structures for a three-axis resonant accelerometer in accordance with another exemplary embodiment of the present invention.

FIG. 9 is a schematic top view diagram of device layer structures for a three-axis resonant accelerometer in accordance with one exemplary embodiment. In this exemplary embodiment, four resonator masses 501, 502, 503, 504 are supported above an underlying substrate (not represented for convenience) and are driven to resonate simultaneously in the X-axis, the Y-axis, and the Z-axis directions relative to the underlying substrate.

Operation of this resonant accelerometer for the X-axis and Y-axis is substantially as described above with reference to FIGS. 1-3, i.e., the resonator masses are driven to resonate simultaneously in the X-axis and the Y-axis directions relative to the underlying substrate by a set of in-plane drive electrodes that are fixedly supported directly or indirectly by the underlying substrate. In-plane motions of the resonator masses relative to the underlying substrate are sensed by a set of in-plane sense electrodes that are fixedly supported directly or indirectly by the underlying substrate. The X-axis and Y-axis sensors can be operated using differential sensing or single-ended sensing.

Figure 10:
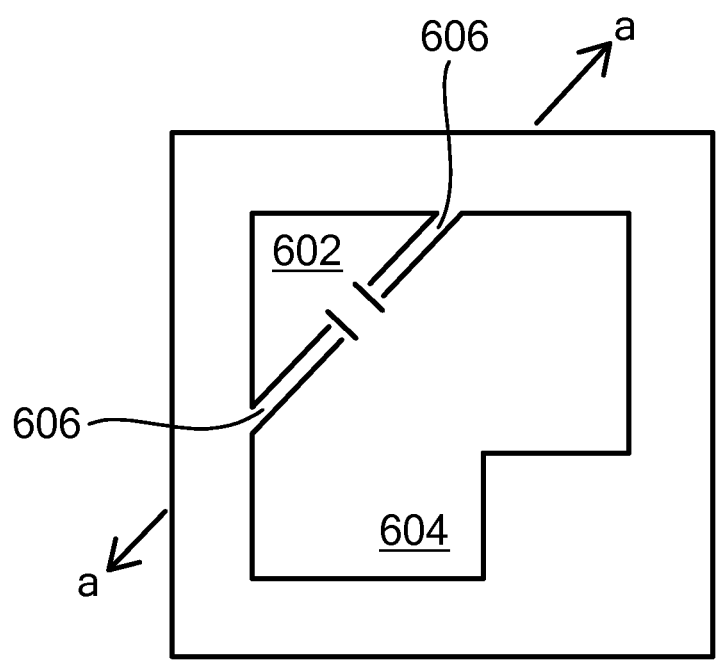
FIG. 10 shows details of a teeter-totter element in accordance with the embodiment of FIG. 9.

FIG. 10 shows details of a teeter-totter element in accordance with the embodiment of FIG. 9 (this is specifically showing details of the teeter-totter element of resonator mass 502 shown in FIG. 9, although the other teeter-totter elements are identical but oriented in different directions due to the symmetry of the structures). Specifically, each teeter-totter element includes two lobes 602 and 604 supported by central pivot flexures 606 that allow the lobes 602 and 604 to move in the z-axis direction in anti-phase with one another with a "teeter-totter" or "see-saw" motion centered around the axis labeled "a" (i.e., lobe 602 moves upward when lobe 604 is moving downward, and lobe 602 moves downward when the lob 604 is moving upward).

Figure 11:
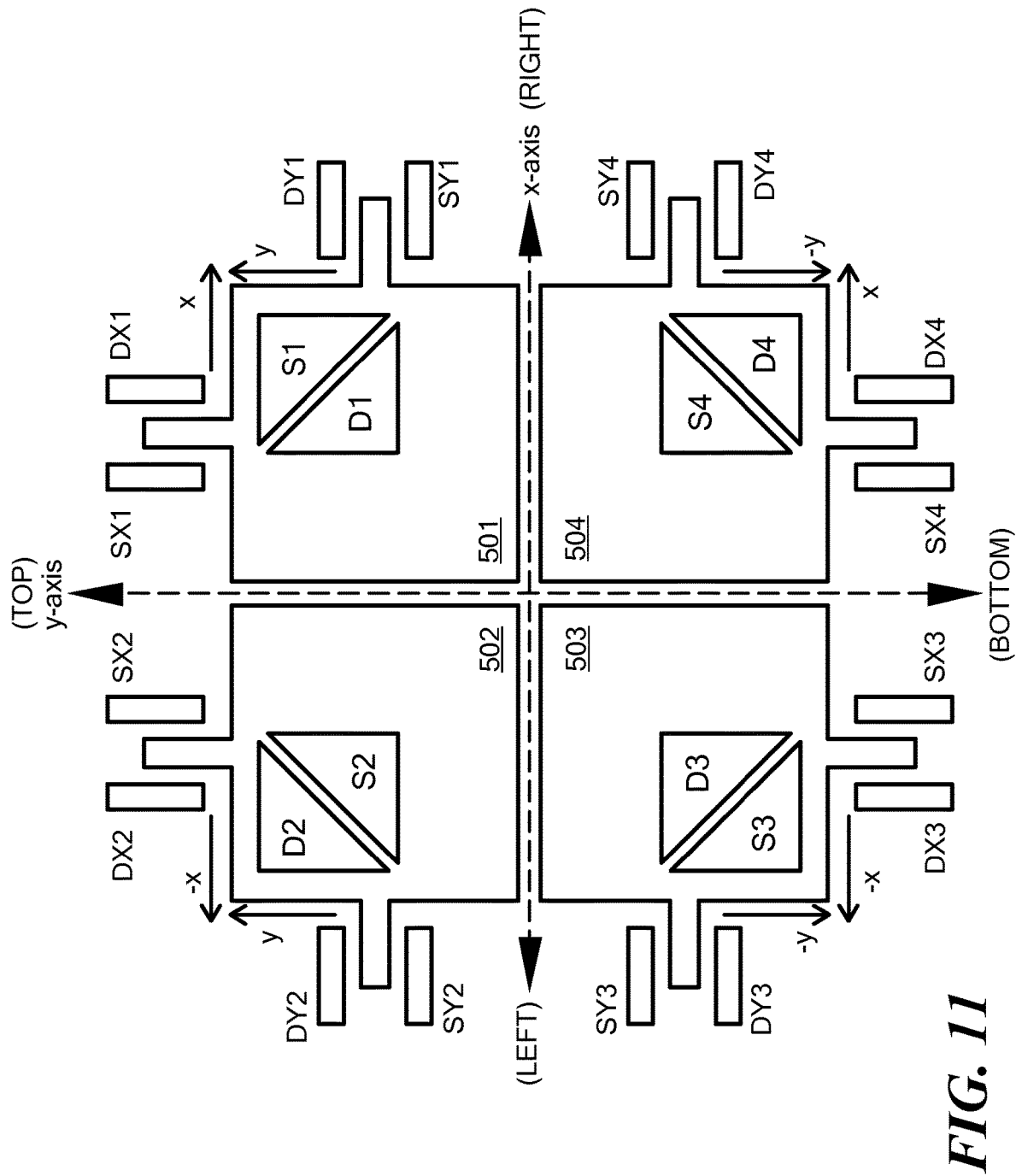
FIG. 11 is a schematic diagram showing the relative placement of drive and sense electrodes underlying the teeter-totter elements, in accordance with one exemplary embodiment.

FIG. 11 is a schematic diagram showing the relative placement of drive "D" and sense "S" electrodes underlying the teeter-totter elements, in accordance with one exemplary embodiment. In this example, there is one Z-axis drive electrode and one Z-axis sense electrode per teeter-totter element. In this example, the teeter-totter elements of resonator masses 501 and 503 are driven in-phase with one another, while the teeter-totter elements of resonator masses 502 and 504 are driven in-phase with one another and in anti-phase to the teeter-totter elements of resonator masses 501 and 503 such that when the lobes of the teeter-totter elements of resonator masses 501 and 503 overlying drive electrodes D1 and D3 are moving downward toward the underlying substrate, the lobes of the teeter-totter elements of resonator masses 502 and 504 overlying sense electrodes S2 and S4 are moving upward away from the underlying substrate, and when the lobes of the teeter-totter elements of resonator masses 501 and 503 overlying drive electrodes D1 and D3 are moving upward away from underlying substrate, the lobes of the teeter-totter elements of resonator masses 502 and 504 overlying sense electrodes S2 and S4 are moving downward toward the underlying substrate. In this example, this is accomplished by driving drive electrodes D1, D2, D3, and D4 in-phase with one another.

Based on Equation (1), when the lobes of the teeter-totter elements of resonator masses 501 and 503 overlying drive electrodes D1 and D3 are moving downward toward the underlying substrate, the $K_{electrostatic}$ will increase and the resonant frequency of the proof masses 501 and 503 will decrease. This resonant frequency change is sensed using sense electrodes S1 and S3, respectively. During the same time, the lobes of the teeter-totter elements of resonator masses 502 and 504 overlying drive electrodes D2 and D4 are moving upward from the underlying substrate, so the $K_{electrostatic}$ will decrease and the resonant frequency of the proof masses 502 and 504 will increase. This resonant frequency change is sensed using sense electrodes S2 and S4, respectively. Similar to the X and Y axes, a Z-axis accelerometer output signal can be produced based on the change in resonance frequencies.

In one specific exemplary embodiment, a three-axis resonant accelerometer of the type shown in FIG. 9 is operated with an x-axis resonance frequency of 39 KHz, a y-axis resonance frequency of 42 KHz, and a z-axis resonance frequency of 43 KHz, although the axes can be operated with different resonance frequencies that may be the same or different from one another.

Similar to X-axis and Y-axis accelerations. Z-axis accelerations act on all four teeter-totter elements and effectively change the gaps between the lobes and the corresponding Z-axis drive/sense electrodes, which in turn effectively changes the spring constants of the central pivot flexures 606 that support the lobes. As a result, the resonance frequency of one pair of lobes increases while the resonance frequency of the other pair of lobes decreases. This relative change of resonance frequencies can be detected differentially using the Z-axis sense electrodes.

For example, during one phase of operation, a Z-axis acceleration that pulls all four masses downward will effectively decrease the resonance frequency of lobes that are moving downward while effectively increasing the resonance frequency of moving upward. The relative changes of resonance frequencies will manifest as a variation in the combined differential output from the Z-axis sense electrodes, which can be sensed in order to provide an accelerometer output signal representative of the acceleration while also filtering out any cross-coupling from the other axes based on the substantial difference in resonance frequencies.

Because the Z-axis sensor elements generally are not mechanically interconnected to ensure that they resonate at the same nominal Z-axis resonance frequency, certain embodiments may include additional electrodes and circuitry to adjust the resonance frequency of one or more of the Z-axis sensor elements so that the Z-axis sensor elements resonate in synchronization with one another.

It should be noted that embodiments of the accelerometers of the types described herein can be extremely compact, e.g., with a sensor size of around 1 mm×1 mm. Such accelerometers are expected to have minimal offset shift from packaging stresses due to the compact size and also from differential sensing in embodiments that use differential sensing. Importantly, such accelerometers can operate under vacuum or very low pressure (e.g., capped) and therefore can be integrated with gyroscopes, e.g., to achieve six degree-of-freedom inertial sensors under one cap.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A multiple-axis resonant accelerometer comprising:
a resonator comprising four proof masses arranged in a device plane, each of the four proof masses forming part of:
an x-axis drive capacitor configured for driving x-axis motions of the proof mass in the device plane;
a y-axis drive capacitor configured for driving y-axis motions of the proof mass in the device plane;
an x-axis sense capacitor configured for sensing changes in x-axis resonance frequency of the proof mass based on electrostatic spring tuning in the presence of an x-axis acceleration; and
a y-axis sense capacitor configured for sensing changes in y-axis resonance frequency of the proof mass based on electrostatic spring tuning in the presence of a y-axis acceleration.

2. The multiple-axis resonant accelerometer of claim 1, wherein the part of the x-axis sense capacitor formed by a first proof mass of the four proof masses and the part of the x-axis sense capacitor formed by a second proof mass of the four proof masses, the first and second proof masses being adjacent to one another and offset from one another along an x-axis, are collectively configured for differential sensing of resonance frequency changes.

3. The multiple-axis resonant accelerometer of claim 1, wherein the x-axis motions and the y-axis motions are driven at the same resonance frequency.

4. The multiple-axis accelerometer of claim 1, wherein the x-axis motions and the y-axis motions are driven at different resonance frequencies.

5. The multiple-axis resonant accelerometer of claim 1, further comprising circuitry configured to determine the changes in x-axis resonance frequency by detecting voltages between the x-axis drive capacitor and the x-axis sense capacitor.

6. The multiple-axis resonant accelerometer of claim 1, wherein the resonator further comprises a z-axis sensor element configured to resonate with z-axis motions normal to the device plane, wherein the multiple-axis resonant accelerometer further comprises:
a z-axis drive electrode configured for driving z-axis motions of the z-axis sensor element; and
a z-axis sense electrode configured for sensing changes in z-axis resonance frequency of the z-axis sensor element based on electrostatic spring tuning in the presence of a z-axis acceleration.

7. The multiple-axis resonant accelerometer of claim 6, wherein the z-axis sensor element comprises a teeter-totter sensor element.

8. A method of operating a multiple-axis resonant accelerometer comprising four proof masses arranged in a device plane, the method comprising:
driving each of the four proof masses to resonate with x-axis motions in the device plane;
driving each of the four proof masses to resonate with y-axis motions in the device plane;
sensing, for each of the four proof masses, changes in x-axis resonance frequency based on electrostatic spring tuning in the presence of an x-axis acceleration; and
sensing, for each of the four proof masses, changes in y-axis resonance frequency based on electrostatic spring tuning in the presence of a y-axis acceleration.

9. The method of claim 8, wherein driving each of the four proof masses to resonate with x-axis motions comprises driving a first proof mass of the four proof masses with a first phase and driving a second proof mass of the four proof masses with a second phase opposite the first phase.

10. The method of claim 8, wherein driving each of the four proof masses to resonate with x-axis motions in the device plane comprises:
driving a first proof mass of the four proof masses and driving a second proof mass of the four proof masses, the first and second proof masses being adjacent to one another and offset from one another along an x-axis, so that differential sensing of resonance frequency changes is performed.

11. The method of claim 8, wherein driving each of the four proof masses to resonate with the x-axis motions comprises driving each of the four proof masses to resonate with the x-axis motions at a first resonance frequency and wherein driving each of the four proof masses to resonate with the y-axis motions comprises driving each of the four proof masses to resonate with the y-axis motions at the first resonance frequency.

12. The method of claim 8, wherein driving each of the four proof masses to resonate with the x-axis motions comprises driving each of the four proof masses to resonate with the x-axis motions at a first resonance frequency and wherein driving each of the four proof masses to resonate with the y-axis motions comprises driving each of the four proof masses to resonate with the y-axis motions at a second resonance frequency different than the first resonance frequency.

13. The method of claim 8, further comprising inferring the changes in x-axis resonance frequency based on differences in voltages between an x-axis drive capacitor and an x-axis sense capacitor.

14. The method of claim 8, wherein the multiple-axis resonant accelerometer further comprises a z-axis sensor element configured to resonate with z-axis motions normal to the device plane, wherein the method further comprises:
driving z-axis motions of the z-axis sensor element; and sensing changes in z-axis resonance frequency of the z-axis sensor element based on electrostatic spring tuning in the presence of a z-axis acceleration.

15. A multiple-axis resonant accelerometer comprising:
a resonator comprising four proof masses arranged in a device plane, each proof mass of the four proof masses comprising:
　means for driving the respective proof mass to resonate with x-axis motions in the device plane;
　means for driving the respective proof mass to resonate with y-axis motions in the device plane;
　means for sensing changes in x-axis resonance frequency of the respective proof mass based on electrostatic spring tuning in the presence of an x-axis acceleration; and
　means for sensing changes in y-axis resonance frequency of the respective proof mass based on electrostatic spring tuning in the presence of a y-axis acceleration.

16. The multiple-axis resonant accelerometer of claim 15, wherein the x-axis motions and the y-axis motions are driven at the same resonance frequency.

17. The multiple-axis resonant accelerometer of claim 15, wherein the x-axis motions and the y-axis motions are driven at different resonance frequencies.

18. The multiple-axis resonant accelerometer of claim 15, further comprising circuitry configured to determine the changes in x-axis resonance frequency by detecting voltages between an x-axis drive capacitor and an x-axis sense capacitor.

19. The multiple-axis resonant accelerometer of claim 15, wherein the resonator further comprises a z-axis sensor element configured to resonate with z-axis motions normal to the device plane, wherein the multiple-axis resonant accelerometer further comprises:
　means for driving z-axis motions of the z-axis sensor element; and
　means for sensing changes in z-axis resonance frequency of the z-axis sensor element based on electrostatic spring tuning in the presence of a z-axis acceleration.

20. The multiple-axis resonant accelerometer of claim 19, wherein the z-axis sensor element comprises a teeter-totter sensor element.

* * * * *